(12) United States Patent
Kobayashi et al.

(10) Patent No.: US 7,826,970 B2
(45) Date of Patent: Nov. 2, 2010

(54) VEHICLE DRIVING ASSIST SYSTEM

(75) Inventors: Yousuke Kobayashi, Yokohama (JP); Genpei Naito, Yokohama (JP); Takeshi Kimura, Yokohama (JP); Hiroyuki Yoshizawa, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 1139 days.

(21) Appl. No.: 11/481,055

(22) Filed: Jul. 6, 2006

(65) Prior Publication Data
US 2007/0012499 A1 Jan. 18, 2007

(30) Foreign Application Priority Data
Jul. 14, 2005 (JP) .............................. 2005-205238

(51) Int. Cl.
*G05D 3/00* (2006.01)
(52) U.S. Cl. .................. 701/300; 701/70; 701/301; 340/435
(58) Field of Classification Search .......... 701/70, 701/300, 301; 340/435
See application file for complete search history.

(56) References Cited

U.S. PATENT DOCUMENTS

| | | | | |
|---|---|---|---|---|
| 4,628,317 A * | 12/1986 | Nishikawa et al. | .......... | 340/903 |
| 6,044,321 A * | 3/2000 | Nakamura et al. | ............ | 701/96 |
| 6,934,614 B2 * | 8/2005 | Yamamura et al. | ............ | 701/45 |
| 7,145,441 B2 * | 12/2006 | Knoop et al. | ............... | 340/435 |
| 7,250,850 B2 * | 7/2007 | Mizutani | ................... | 340/435 |
| 7,308,839 B2 * | 12/2007 | Hijikata | ........................ | 74/514 |
| 7,560,826 B2 * | 7/2009 | Hijikata et al. | ............... | 307/9.1 |
| 7,668,633 B2 * | 2/2010 | Diebold et al. | ................ | 701/36 |
| 2003/0060936 A1 * | 3/2003 | Yamamura et al. | ............ | 701/1 |
| 2003/0236608 A1 * | 12/2003 | Egami | ........................ | 701/70 |
| 2004/0030497 A1 * | 2/2004 | Knoop et al. | ............... | 701/301 |
| 2004/0122573 A1 * | 6/2004 | Mizutani | ................... | 701/45 |

(Continued)

FOREIGN PATENT DOCUMENTS

EP 1544070 A1 6/2005

(Continued)

OTHER PUBLICATIONS

An English translation of the Japanese Office Action of corresponding Japanese Application No. 2008-126950, dated Jun. 15, 2010.

*Primary Examiner*—Khoi Tran
*Assistant Examiner*—Nikhil Sriraman
(74) *Attorney, Agent, or Firm*—Global IP Counselors, LLP

(57) ABSTRACT

A vehicle driving assist system executes an actuation reaction force control of accelerator pedal, a driving force control or a braking force control in a manner that is appropriate in consideration of the traffic situation in which the vehicle is being driven. The vehicle driving assist system calculates a risk potential that indicates the degree of convergence between the vehicle and an obstacle existing in front of the vehicle based on a prescribed control pattern. Then, based on the risk potential, the accelerator pedal actuation reaction, the host vehicle driving force and/or the host vehicle braking force are controlled. The intent of the driver regarding acceleration and deceleration based on the actuation state of the accelerator pedal is preferably used in controlling one or all of the accelerator pedal actuation reaction, the host vehicle driving force and the host vehicle braking force.

20 Claims, 29 Drawing Sheets

U.S. PATENT DOCUMENTS

| | | | |
|---|---|---|---|
| 2005/0222742 A1* | 10/2005 | Yamamura | 701/70 |
| 2007/0030132 A1* | 2/2007 | Kobayashi et al. | 340/436 |
| 2007/0032914 A1* | 2/2007 | Kondoh et al. | 701/1 |
| 2007/0198136 A1* | 8/2007 | Kobayashi et al. | 701/1 |
| 2007/0272464 A1* | 11/2007 | Takae et al. | 180/169 |

FOREIGN PATENT DOCUMENTS

| | | |
|---|---|---|
| EP | 1544071 A1 | 6/2005 |
| JP | 2004-189141 A | 7/2004 |
| JP | 2005-112242 | 4/2005 |
| JP | 2005-115816 A | 4/2005 |
| JP | 2005-180196 A | 7/2005 |

\* cited by examiner (a) CASE WHEN THE DISTANCE BETWEEN BOTH CARS IS LONG (b) CASE WHEN THE DISTANCE BETWEEN BOTH CARS IS SHORT

VEHICLE DRIVING ASSIST SYSTEM

CROSS-REFERENCE TO RELATED APPLICATIONS

This application claims priority under 35 U.S.C. §119 to Japanese Patent Application No. 2005-205238. The entire disclosure of Japanese Patent Application No. 2005-205238 is hereby incorporated herein by reference.

BACKGROUND OF THE INVENTION

1. Field of the Invention

The present invention generally relates to a vehicle driving assist system. More specifically, the present invention relates to a vehicle driving assist system configured to assist a driver with respect to operation of a vehicle based on a detectable intention of the driver.

2. Background Information

A vehicle driving assist system has been proposed to control an actuation reaction force exerted by the accelerator pedal of a vehicle and a braking/driving force exerted against the vehicle based on the amount of risk existing in the vicinity of the vehicle and the chance of contact occurring between the vehicle and an obstacle. (See, for example, Japanese Laid-Open Patent Publication No. 2005-112242.)

In view of the above, it will be apparent to those skilled in the art from this disclosure that there exists a need for an improved vehicle driving assist system. This invention addresses this need in the art as well as other needs, which will become apparent to those skilled in the art from this disclosure.

SUMMARY OF THE INVENTION

It has been discovered that in a vehicle driving assist system as described above assists the driver with respect to driving the vehicle by conveying to the driver the amount of risk existing in the vicinity of the vehicle and the chance of contact occurring between the vehicle and an obstacle. The risk and chance of contact are conveyed through the actuation reaction force exerted by the accelerator pedal and the feeling of deceleration of the vehicle. However, when the vehicle is traveling in heavy traffic, crowded merge situations, or other situations in which the driver deliberately drives at a short following distance with respect to preceding vehicles, such a system sometimes executes excessive control that is contrary to the driver's intent. Thus, the conventional system sometimes has difficulty executing control that is appropriate when the driver is driving in a manner that is tailored to a particular traffic situation.

In order to achieve the above mentioned object and other objects of the present invention, a vehicle driving assist system is provided that basically comprises a traveling situation detecting section, a relative position calculating section, an accelerator pedal actuation state detecting section, a control pattern selecting section, a risk potential calculating section and a control section. The traveling situation detecting section is configured to output a traveling situation detection result based on at least a distance between a host vehicle and an obstacle existing in front of the host vehicle and a speed of the host vehicle. The relative position calculating section is configured to calculate a positional relationship between the host vehicle and the obstacle based on the traveling situation detection result of the traveling situation detecting section. The accelerator pedal actuation state detecting section is configured to detect an accelerator pedal actuation state of an accelerator pedal of the host vehicle by a driver. The control pattern selecting section is configured to select a selected vehicle control pattern from among a plurality of vehicle control patterns based on the accelerator pedal actuation state detected by the actuation state detecting section and the positional relationship between the host vehicle and the obstacle calculated by the relative position calculating section. The risk potential calculating section is configured to calculate a risk potential that indicates a degree of convergence between the host vehicle and the obstacle based on the traveling situation detection result of the traveling situation detecting section. The calculation is executed in accordance with the selected vehicle control pattern selected by the control pattern selecting section. The control section is configured to control at least one of an actuation reaction force exerted by the accelerator pedal and a braking/driving force exerted against the host vehicle based on the risk potential calculated by the risk potential calculating section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
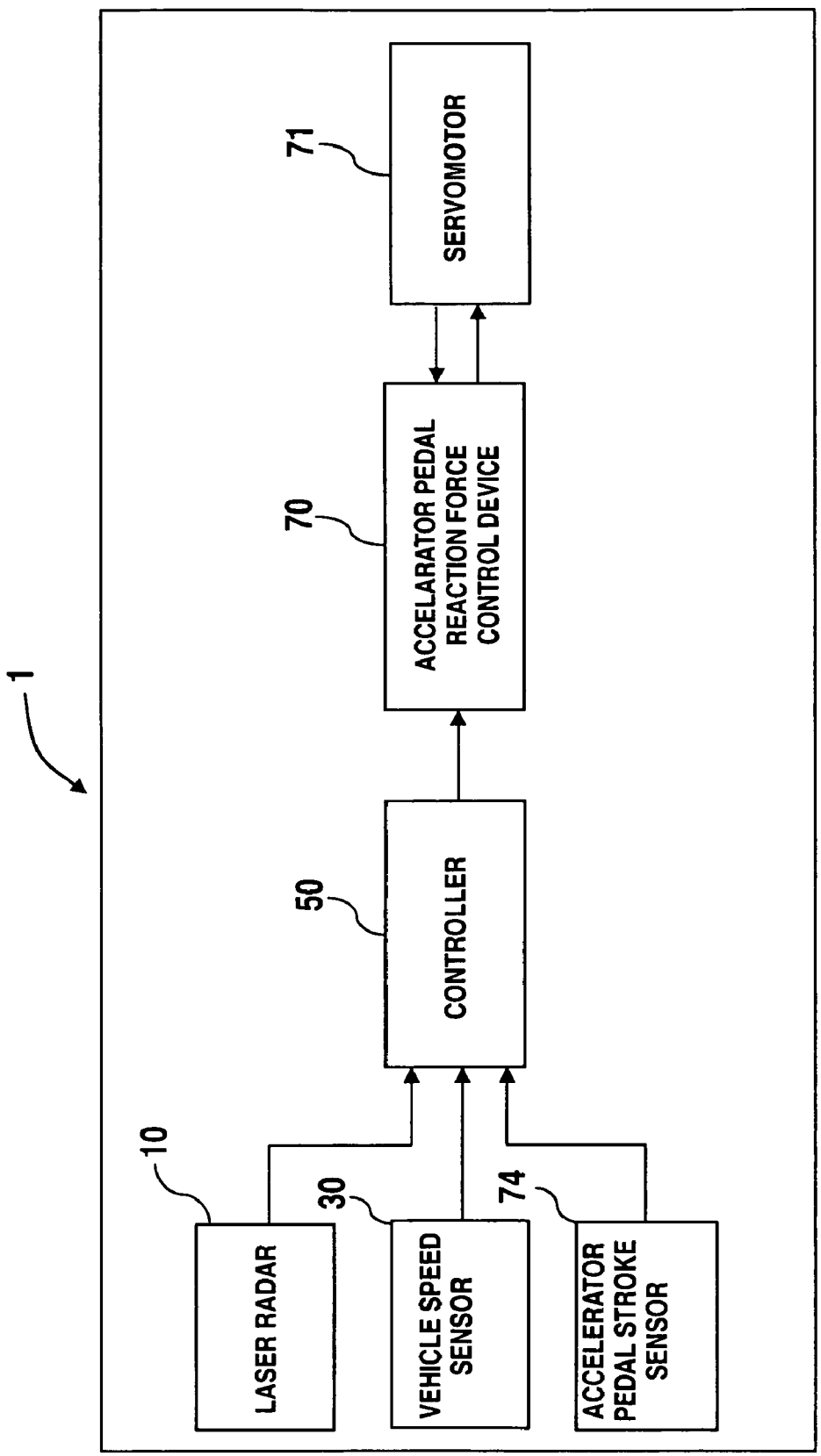
FIG. 1 is a block diagram of a vehicle driving assist system in accordance with a first embodiment of the present invention.
Figure 2:
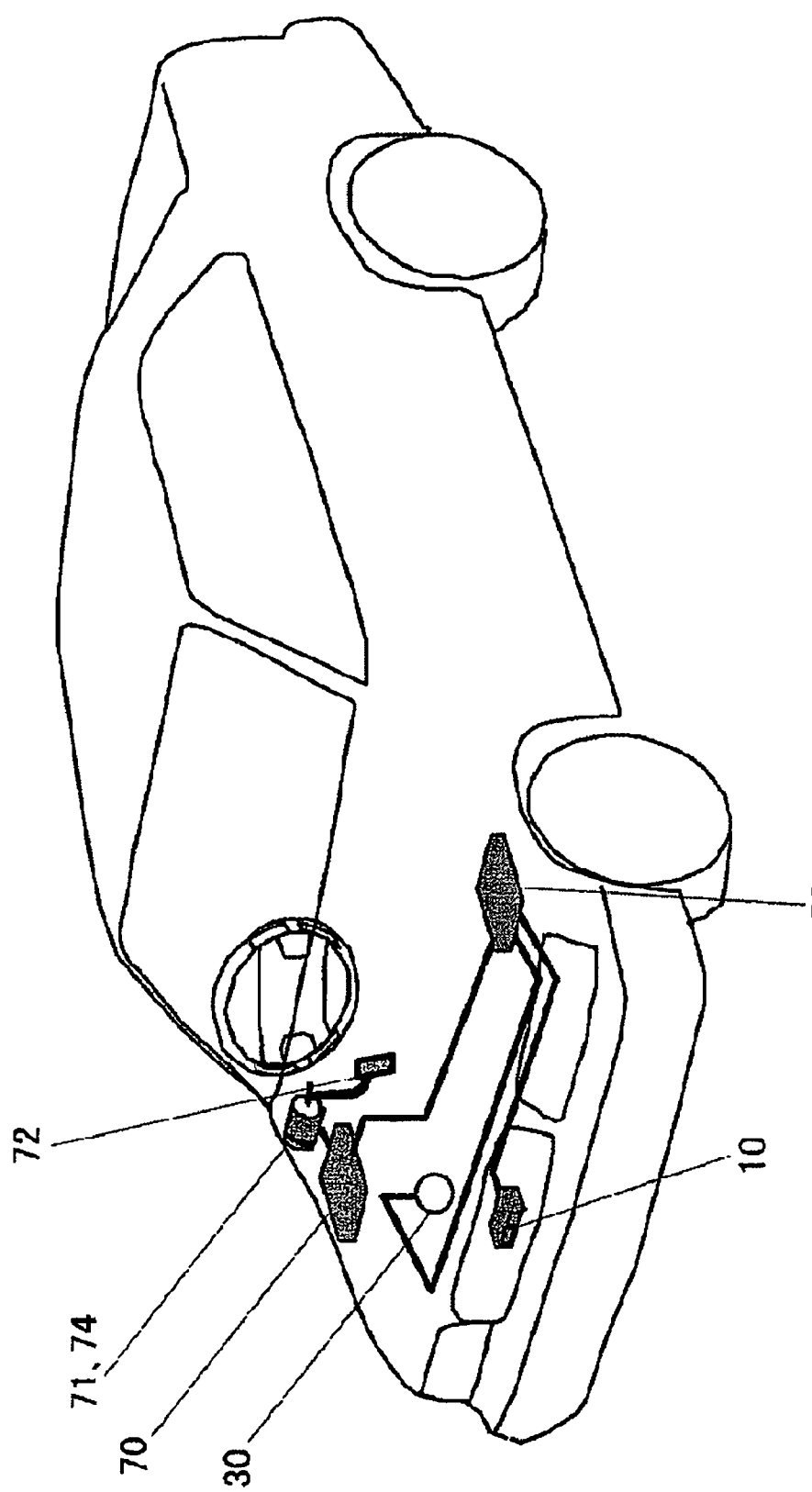
FIG. 2 is a schematic perspective view of a vehicle in which the vehicle driving assist system shown in FIG. 1 is installed in accordance with the first embodiment of the present invention.

Referring initially to FIGS. 1 and 2, a vehicle driving assist system 1 is illustrated in accordance with a first embodiment of the present invention. FIG. 1 is a block diagram of a vehicle driving assist system in accordance with the first embodiment of the present invention. FIG. 2 is a schematic perspective view of a vehicle (hereinafter also called "the host vehicle") in which the vehicle driving assist system shown in FIG. 1 is installed in accordance with the first embodiment of the present invention. With the present invention, an appropriate control pattern (explained below) is selected in consideration of an accelerator pedal actuation state and a positional relationship between the host vehicle and an obstacle, both of which vary depending on the traffic situation surrounding the vehicle. Consequently, information can be conveyed to the driver through the accelerator pedal actuation reaction force of the accelerator pedal and/or the braking/driving force of the host vehicle while also reducing the annoyance that results when control that is contrary to the driver's intent is executed.

First, the main structures and features of the vehicle driving assist system will now be explained. A laser radar 10 is mounted to a front grill portion, a bumper portion, or the like of the vehicle and serves to horizontally scan a region in front of the vehicle with an infrared light pulse. The laser radar 10 then measures the reflected light resulting from the infrared light reflecting off of a plurality of reflecting objects located in front of the vehicle (normally, the rear ends of preceding vehicles). By measuring the time required for the reflected light to arrive, the laser radar 10 detects the following distance and existence direction to a plurality of vehicles. The detected following distances and existence directions are sent to a controller 50. In this embodiment, the existence directions of preceding objects can be expressed as a relative angle with respect to the vehicle in which the driving assist system 1 is installed. The region in front of the host vehicle scanned by the laser radar 10 is, for example, ±6 degrees with respect to the front of the host vehicle and the system detects preceding objects existing within this angular range.

The vehicle speed sensor 30 is configured and arranged to detect the speed of the host vehicle in which the system 1 is installed. The vehicle speed sensor 30 outputs a signal indicative of the speed of the host vehicle to the controller 50. For example, the vehicle speed sensor 30 is configured and arranged to measure the rotational speed of the wheels and the rotational speed of the output side of the transmission, and then output the detected vehicle speed to the controller 50.

The controller 50 comprises a CPU and a ROM, a RAM, and other components peripheral to the CPU and serves to control the entire vehicle driving assist system 1. Based on the speed of the host vehicle received from the vehicle speed sensor 30 and the distance information received from the laser radar 10, the controller 50 recognizes the obstacle situation in the vicinity of the host vehicle, e.g., recognizes the traveling situation with respect to the obstacles in terms of relative distances and relative velocities with respect to the obstacles. Based on the obstacle situation, the controller 50 calculates risk potentials indicating the degree of convergence between the host vehicle and each obstacle. The controller 50 also executes the control described below based on the risk potentials with respect to the obstacles.

By controlling the reaction force generated when the accelerator pedal 72 is depressed, the vehicle driving assist system 1 in accordance with the first embodiment assists driver in an appropriate manner with respect to acceleration and deceleration of the host vehicle. In order to accomplish this, the controller 50 calculates a vehicle longitudinal reaction force control amount based on the risk potentials with respect to the obstacles in front of the host vehicle. The controller 50 outputs the calculated longitudinal reaction force control amount to an accelerator pedal reaction force control device 70.

Based on the reaction force control amount from the controller 50, the accelerator pedal reaction force control device 70 controls the torque generated by a servomotor 71 built into a linkage mechanism of the accelerator pedal 72. The servomotor 71 is configured and arranged to control the reaction force generated based on a command value from the accelerator pedal reaction force control device 70 and can freely control the actuation reaction force (accelerator pedal depression force) generated when the driver operates the accelerator pedal 72.

The accelerator pedal stroke sensor 74 is configured and arranged to detect the depression amount (actuation amount) of the accelerator pedal 72 and output a signal indicative of the depression amount (actuation or operation amount) of the accelerator pedal 72. The depression amount of the accelerator pedal 72 is converted into a rotation angle of the servomotor 71 by a linkage mechanism. The accelerator pedal stroke sensor 74 outputs the detected accelerator pedal actuation amount to the controller 50.

Figure 3:
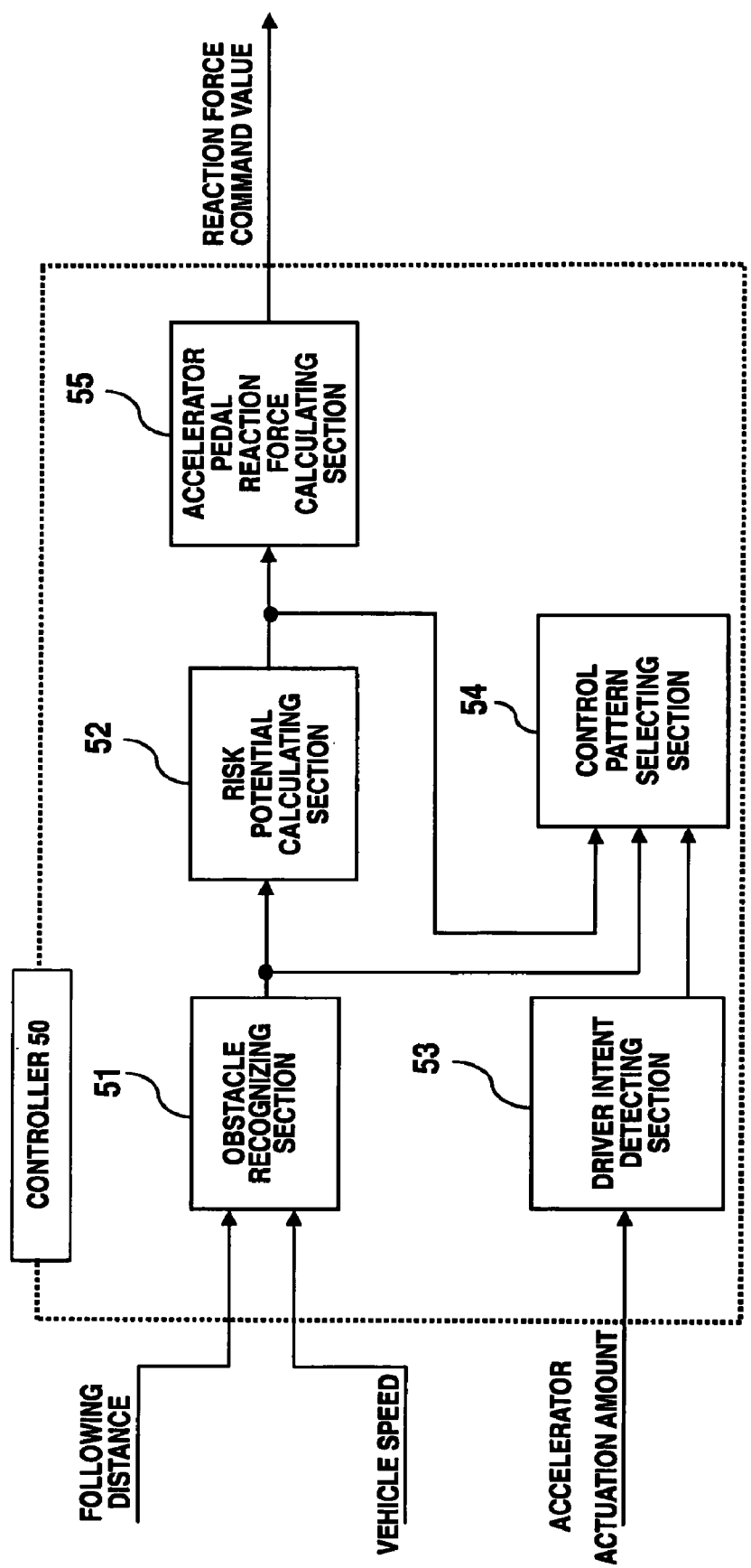
FIG. 3 is a block diagram illustrating selected internal components of the controller of the vehicle driving assist system in accordance with the first embodiment of the present invention.

FIG. 3 is a simplified block diagram of the internal and peripheral components of the controller 50. The controller 50 preferably includes a microcomputer with a control program that controls the system 1 in a manner as discussed below. The controller 50 can also include other conventional components such as an input interface circuit, an output interface circuit, and storage devices such as a ROM (Read Only Memory) device and a RAM (Random Access Memory) device. Thus, the internal and peripheral components of the controller 50 are configured such that the controller 50 includes an obstacle recognizing unit or section 51, a risk potential calculating unit or section 52, an intent detecting unit or section 53, a control pattern selecting unit or section 54, and an accelerator pedal reaction force calculating unit or section 55. It will be apparent to those skilled in the art from this disclosure that the precise structure and algorithms for these units or sections 51 to 55 as well as other units or sections can be any combination of hardware and software that will carry out the functions of the present invention. Thus, "means plus function" clauses as utilized in the specification and claims should include any structure or hardware and/or algorithm or software that can be utilized to carry out the function of the "means plus function" clause.

The obstacle recognizing unit 51 is configured and/or arranged to recognize the obstacle situation in the vicinity of the host vehicle based on detection values from the laser radar 10 and the vehicle speed sensor 30. Based on the obstacle situation recognized by the obstacle recognizing unit 51, the risk potential calculating unit 52 is configured and arranged to calculate the risk potential RP indicating the degree of convergence between the host vehicle and an obstacle in front of the host vehicle. The intent detecting unit 53 is configured and/or arranged to determine the driver's intent. More specifically, the intent detecting unit 53 is configured and/or arranged to determine the driver's intention with respect to acceleration or deceleration based on the operating state of the accelerator pedal 72 detected by the accelerator pedal stroke sensor 74.

The control pattern selecting unit 54 is configured and/or arranged to select a control pattern for executing accelerator pedal reaction force control based on the obstacle situation in the vicinity of the host vehicle, the risk potential RP with respect to an obstacle in front of the host vehicle, and the acceleration/deceleration intent of the driver. In accordance with the control pattern selected by the control pattern selecting unit 54, the accelerator pedal reaction force calculating unit 55 calculates a command value (reaction force control amount) for the accelerator pedal actuation reaction force based on the risk potential RP.

Figure 4:
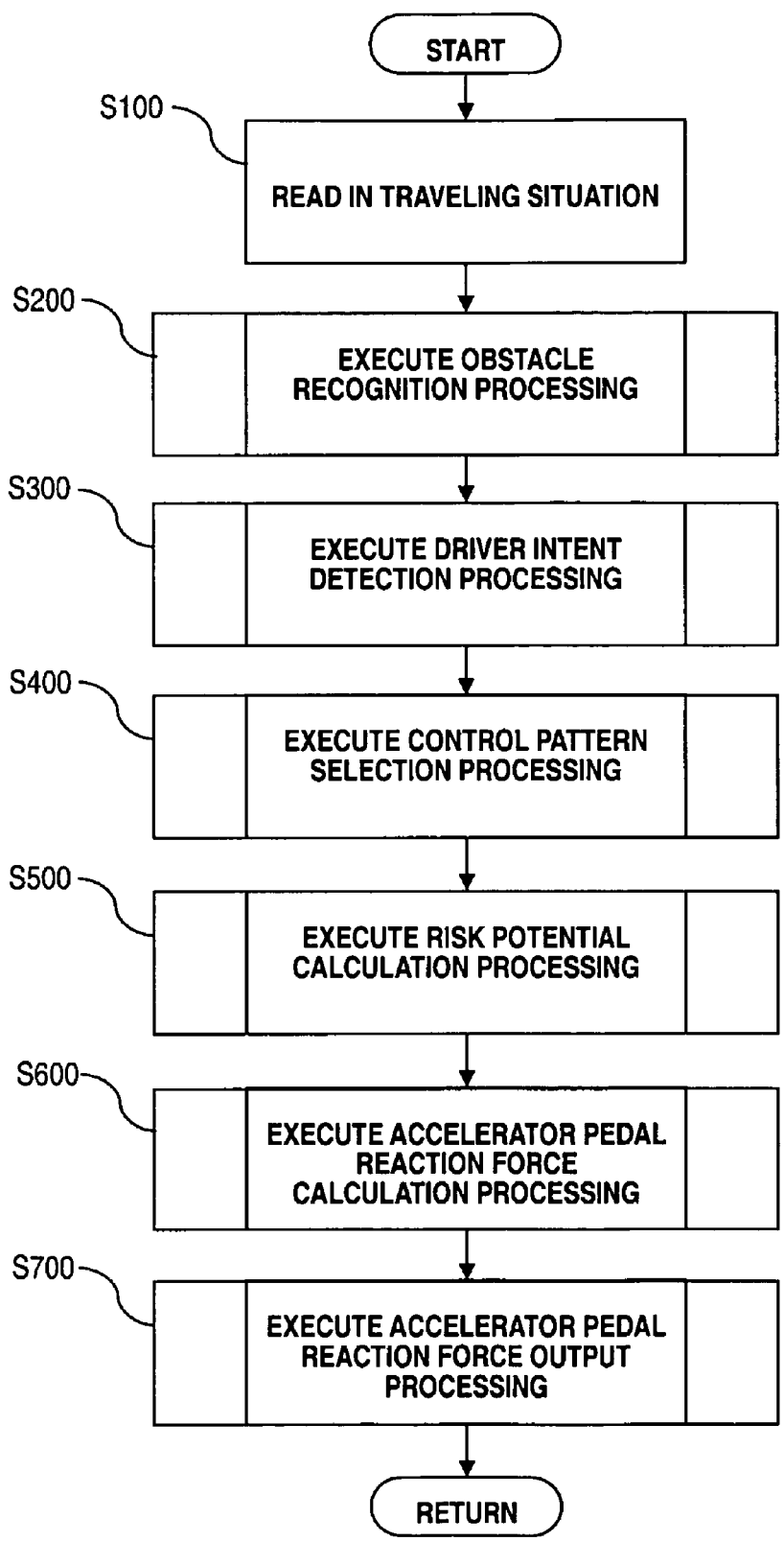
FIG. 4 is a flowchart illustrating the processing steps of the driving assistance control program executed by the controller of the vehicle driving assist system in accordance with the first embodiment of the present invention.

The operation of a vehicle driving assist system 1 in accordance with the first embodiment will now be explained with reference to FIG. 4. FIG. 4 is a flowchart showing the processing steps of the driving assistance control executed by the controller 50 in the first embodiment. This control loop is executed continuously once per prescribed time period, e.g., every 50 msec.

In step S100, the controller 50 reads in the traveling situation. The traveling situation mentioned here constitutes information related to the traveling circumstances of the host vehicle, including information regarding obstacles in front of the host vehicle. Thus, the controller 50 reads in A following distance X and an existence direction to the obstacle detected by the laser radar 10 and a host vehicle speed Vh of the host vehicle detected by the vehicle speed sensor 30. The controller 50 also reads in the accelerator pedal actuation amount SA detected by the accelerator pedal stroke sensor 74.

In step S200, the controller 50 recognizes the situation regarding obstacles in front of the host vehicle based on the traveling situation data read in step S100. More specifically, the controller 50 recognizes a current relative position, a movement direction, and a movement velocity of the object with respect to the host vehicle based on the current traveling situation data obtained in step S100 and based on relative position, a movement direction, and a movement velocity of the object with respect to the host vehicle that were detected during or prior to the previous control cycle and stored in the memory of the controller 50. The controller 50 then recognizes the manner in which the obstacle is disposed in front of the host vehicle and the manner in which the obstacle is moving relative to the movement of the host vehicle.

Figure 5:
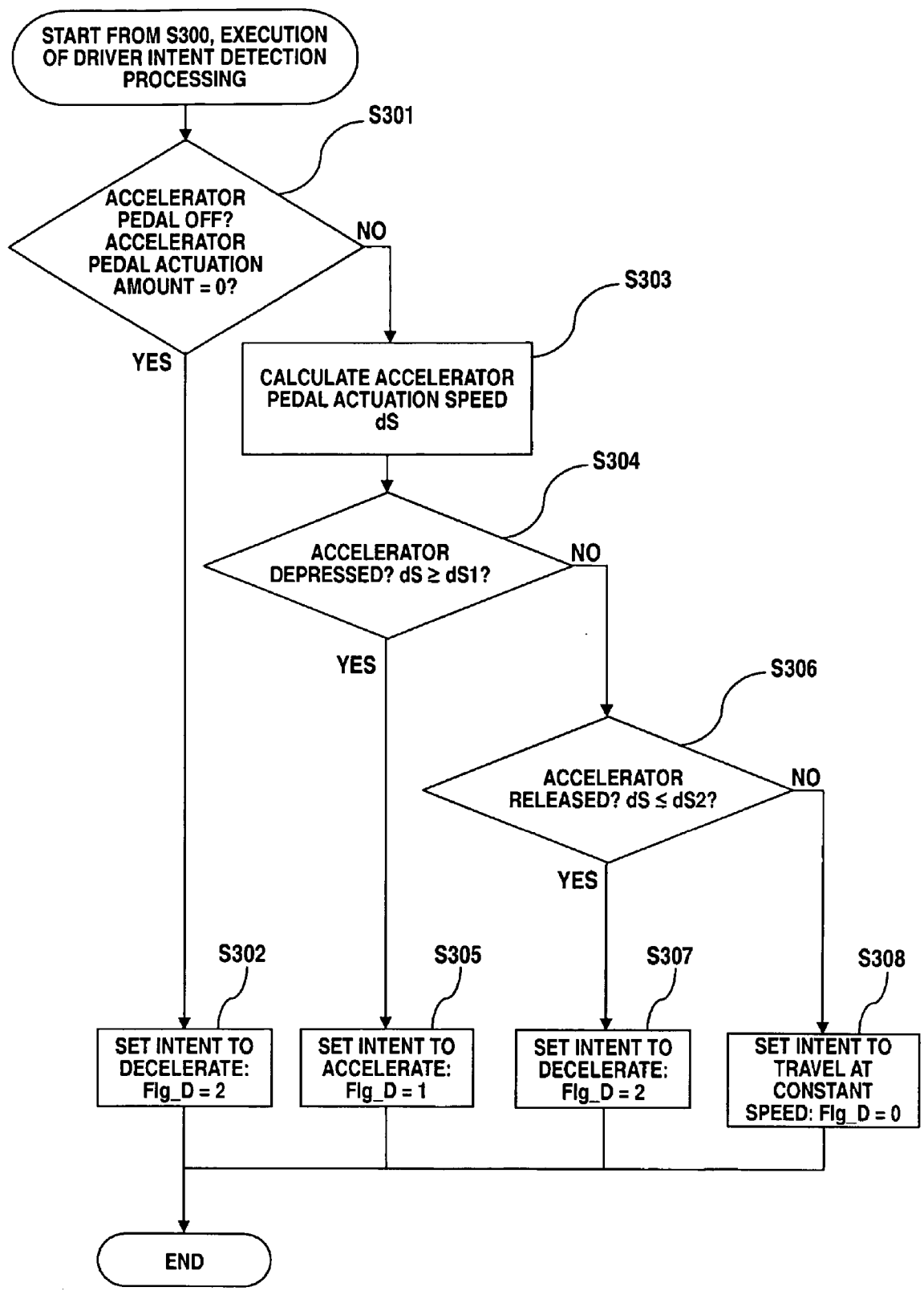
FIG. 5 is a flowchart for explaining the processing steps executed in order to detect the intent of the driver.

In step S300, the controller 50 detects a driving intent of the driver. More specifically, the controller 50 detects the driver's intentions regarding acceleration and deceleration. The control processing executed in order to determine the driver's intentions will now be explained with reference to the flowchart of FIG. 5.

In step S301, the controller 50 determines if the accelerator pedal 72 is in a released state. More specifically, the controller 50 determines if the current accelerator pedal actuation amount SA detected by the accelerator pedal stroke sensor 74 is 0. If so, the controller 50 proceeds to step S302 and sets the value of a flag Flg_D to 2, indicating that it has determined the driver's intent is to decelerate.

If the accelerator pedal 72 is being depressed and the result of step S301 is negative, then the controller 50 proceeds to step S303 and calculates the accelerator pedal actuation speed dS. The accelerator pedal actuation speed dS can be calculated by, for example, calculating a time differential of the accelerator pedal actuation amount SA. The accelerator pedal actuation speed dS is expressed as a positive value when the accelerator pedal 72 is being depressed and as a negative value when the accelerator pedal 72 is being released.

In step S304, the controller 50 determines if the accelerator pedal 72 is in the process of being depressed. More specifically, the controller 50 compares the accelerator pedal actuation speed dS calculated in step S303 to a prescribed value dS1 (i.e., dS1>0). If dS≧dS1, the controller 50 determines that the accelerator pedal 72 is being depressed and proceeds to step S305, where it sets the value of the flag Flg_D to 1 to indicate that the driver's intent is to accelerate.

If the result of step S304 is negative, then the controller 50 proceeds to step S306 and determines if the accelerator pedal 72 is in the process of being released. More specifically, the controller 50 compares the accelerator pedal actuation speed dS to a prescribed value dS2 (i.e., dS2<0) and determines that the accelerator pedal 72 is being released if dS≦dS2. If the accelerator pedal 72 is in the process of being released, then the controller 50 proceeds to step S307 and sets the value of the flag Flg_D to 2 to indicate that the driver's intent is to decelerate. If value of dS is found to be between dS2 and dS1 (dS2<dS<dS1) in step S306, then the controller 50 determines that the driver is holding the accelerator pedal 72 at a particular position and proceeds to step S308.

In step S308, the controller 50 sets the value of the flag Flg_D to 0 to indicate that the driver's intent is to maintain the current traveling state without accelerating or decelerating. In other words, the controller 50 determines that the driver's intent is to travel at (maintain) a constant speed. The prescribed values dS1 and dS2 are threshold values that are set appropriately in advance for determining if the driver intends to accelerate, decelerate, or maintain a constant speed based on the actuation state of the accelerator pedal 72.

Figure 6:
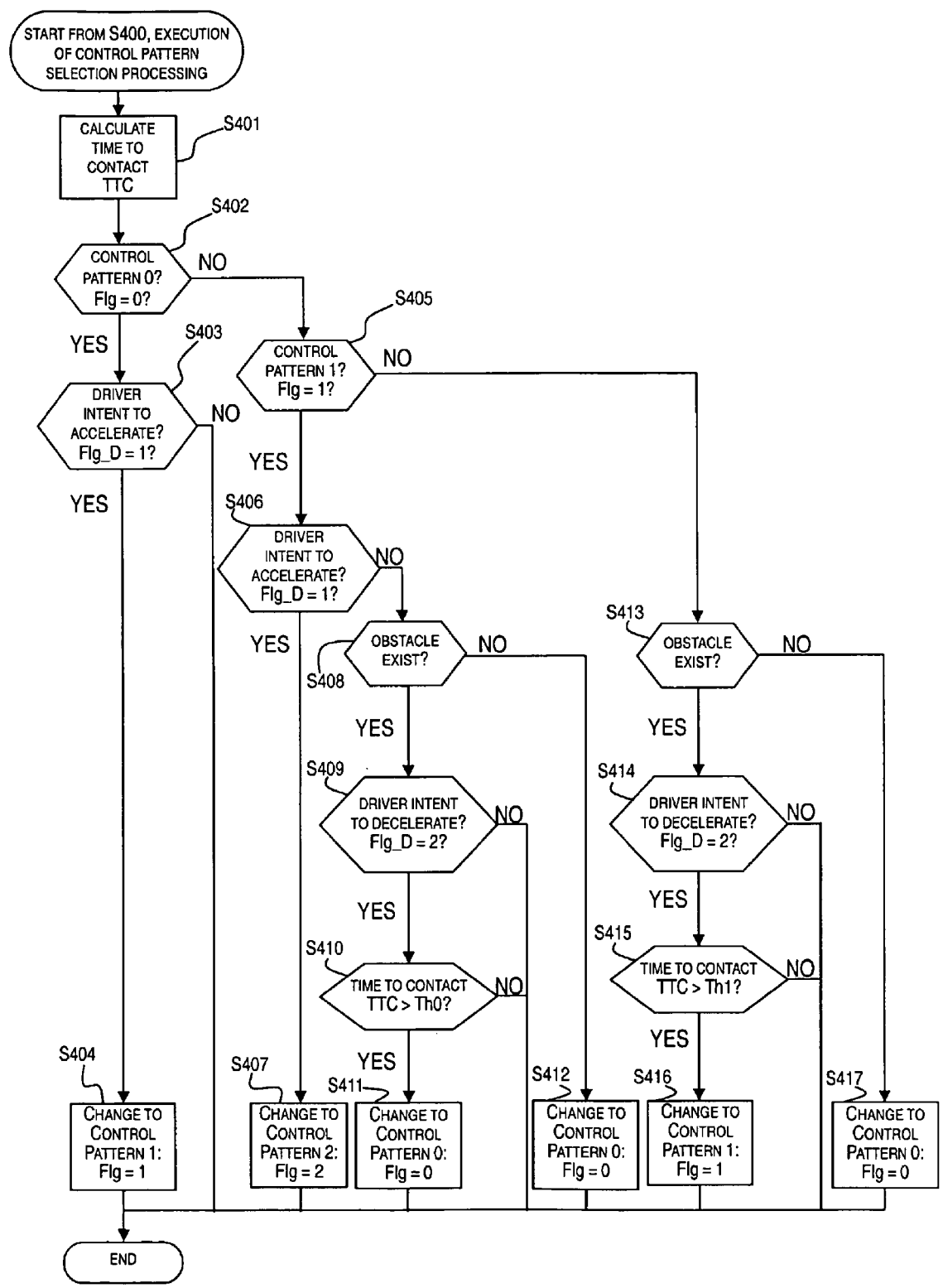
FIG. 6 is a flowchart for explaining the processing steps executed in order to select the control pattern.

After the controller 50 predicts the driver's intent in step S300, the controller 50 proceeds to step S400 of FIG. 4 in which the control process of the flow chart shown in FIG. 6 is executed.

In step S400, the controller 50 selects a control pattern among a plurality of control patterns for executing accelerator pedal reaction force control. The control pattern expresses the manner in which the accelerator pedal reaction force control will be executed. The control patterns are something that produces a detectable driver condition. The control patterns indicate a control execution region in which the accelerator pedal reaction force control is executed. In this embodiment, the control patterns that can be selected include a Control Pattern 0 (Flg=0) having a long control execution region, a Control Pattern 1 (Flg=1) having a medium control execution region, and a Control Pattern 2 (Flg=2) having a short control execution region.

Control Pattern 0 has a long control execution region and serves to start the actuation reaction force control at an early stage when an obstacle exists in front of the host vehicle so as to inform the driver of the situation regarding the obstacle. Thus, with Control Pattern 0, the driver can be encouraged to operate the host vehicle in an appropriate manner in traffic situations in which there are comparatively few other vehicles and following distances with respect to obstacles in front of the host vehicle are somewhat large. Control Pattern 1 has a medium-length control execution region and is used to execute the actuation reaction force control in situations where the obstacle in front of the host vehicle is closer than in situations where Control Pattern 0 is used. Control Pattern 2 has a short control execution region and is used to execute the actuation reaction force control in situations where the chances of contact between the host vehicle and the preceding obstacle are high. The driver's own driving operations are given priority in situations where the driver deliberately drives in close proximity to a preceding obstacle, such as in crowded traffic situations and merge situations. Meanwhile, if the chances of contact are high, a large actuation reaction force is generated to alert the driver and reduce the chances of contact.

The control processing executed by the controller 50 in order to select the control pattern will now be explained with reference to the flowchart of FIG. 6.

In step S401, the controller 50 calculates the amount of time TTC (time to contact) until the host vehicle contacts the obstacle, e.g., a preceding vehicle, recognized in front of the host vehicle in step S200. The time to contact TTC is a physical quantity indicating the current degree of convergence of the host vehicle with respect to the preceding vehicle. More specifically, the time to contact TTC is a value indicating the number of seconds until the following distance X becomes zero and the host vehicle contacts the preceding vehicle if the current traveling state continues, i.e., if the host vehicle speed Vh and the relative velocity Vr (i.e., Vr=vehicle speed−preceding vehicle speed) remain constant. The time to contact TTC with respect to the preceding vehicle is found using the Equation 1 shown below.

$$TTC = X/Vr \qquad \text{(Equation 1)}$$

The smaller the time to contact TTC is, the more eminent the contact with the preceding vehicle is and the larger the degree of convergence with respect to the preceding vehicle is. For example, it is known that when approaching a preceding vehicle, most drivers start taking action to decelerate before the time to contact TTC reaches 4 seconds or less. When an obstacle does not exist in front of the host vehicle, the time to contact TTC is infinity.

In step S402, the controller 50 determines if the current control pattern, i.e., the control pattern set in the previous control cycle, is Control Pattern 0 (Flg=0). If the current control pattern is Control Pattern 0, i.e., the long control execution region, then the controller 50 proceeds to step S403 and determines if the intent of the driver detected in step S300 is to accelerate (Flg_D=1). If the result of step S403 is positive, then the controller 50 proceeds to step S404 and changes the control pattern to Control Pattern 1 (Flg=1), i.e., the medium-length control execution region. If the result of step S403 is negative, then the controller 50 continues using the control pattern (Control Pattern 0) set in the previous control cycle.

If the result of step S402 is negative, then the controller 50 proceeds to step S405 and determines if the current control pattern is Control Pattern 1 (Flg=1). If the result of step S405 is positive, then the controller 50 proceeds to step S406 and determines if the intent of the driver is to accelerate (Flg_D=1).

If the result of step S406 is positive, then the controller 50 proceeds to step S407 and changes the control pattern to Control Pattern 2 (Flg=2), i.e., the short control execution region.

If the result of step S406 is negative, then the controller 50 proceeds to step S408 and determines if an obstacle exists in front of the host vehicle. More specifically, the controller 50 determines if the laser radar 20 detects an obstacle existing in front of the host vehicle in the same lane as the host vehicle.

If an obstacle, e.g., a preceding vehicle exists, the controller 50 proceeds to step S409 and determines if the intent of the driver is to decelerate (Flg_D=2). If the result of step S409 is positive, then the controller 50 proceeds to step S410 and compares the time to contact TTC calculated in step S401 to a threshold value Th0. The threshold value Th0 is used for determining if the control pattern having the long control execution region, i.e., Control Pattern 0, should be selected. The threshold value Th0 is set to an appropriate value in advance.

If the time to contact TTC is larger than Th0, then the controller 50 proceeds to step S411 and changes the control pattern to Control Pattern 0 (Flg=0), i.e., the long control execution region. If the result of step S409 or S410 is negative, i.e., if the driver does not intend to decelerate or the time to contact TTC is less than or equal to the threshold value Th0, then the controller 50 continues using Control Pattern 1 as set in the previous control cycle. If the result of step S408 is negative, i.e., if an obstacle does not exist in front of the host vehicle, then the controller 50 proceeds to step S412 and changes the control pattern to Control Pattern 0 (Flg=0), i.e., the long control execution region.

If the result of step S405 is negative and the current control pattern is Control Pattern 2, then the controller 50 proceeds to step S413 and determines if an obstacle exists in front of the host vehicle. If an obstacle exists, then the controller 50 proceeds to step S414 and determines if the intent of the driver is to decelerate (Flg_D=2). If the result of step S414 is positive, then the controller 50 proceeds to step S415 and compares the time to contact TTC calculated in step S401 to a threshold value Th1. The threshold value Th1 is used for determining if the control pattern having the medium control execution region, i.e., Control Pattern 1, should be selected. The threshold value Th1 is set in advance to an appropriate value that is less than Th0.

If the time to contact TTC is larger than the threshold value Th1, then the controller 50 proceeds to step S416 and changes the control pattern to Control Pattern 1 (Flg=1), i.e., the medium control execution region. If the result of step S414 or S415 is negative, i.e., if the driver does not intend to decelerate or the time to contact TTC is less than or equal to the threshold value Th1, then the controller 50 continues using Control Pattern 2 as set in the previous control cycle. If the result of step S413 is negative, i.e., if an obstacle does not exist in front of the host vehicle, then the controller 50 proceeds to step S417 and changes the control pattern to Control Pattern 0 (Flg=0), i.e., the long control execution region.

Figure 8:
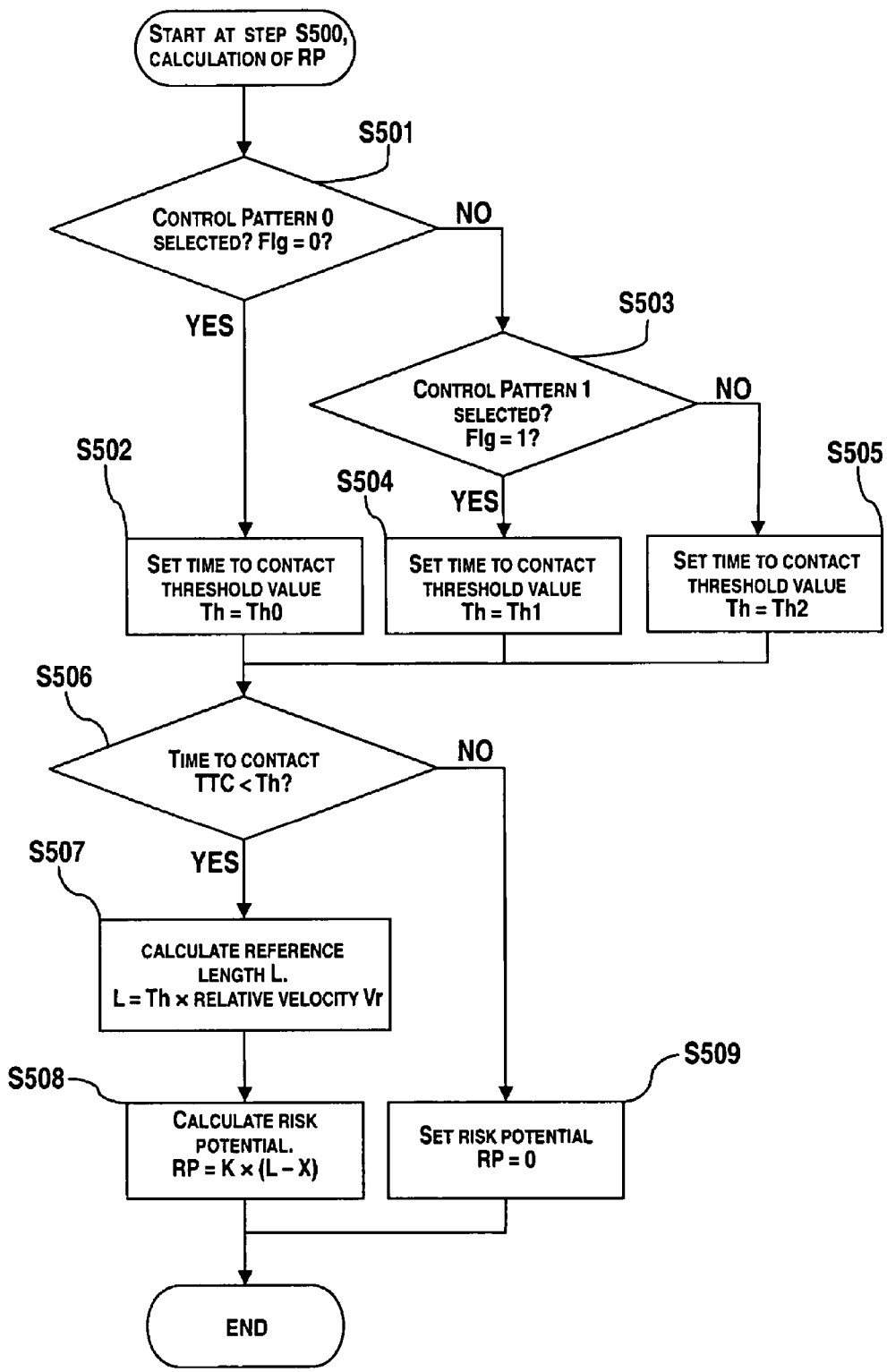
FIG. 8 is a flowchart for explaining the processing steps executed in order to calculate the risk potential.

After the controller 50 selects the appropriate control pattern in step S400, the controller 50 proceeds to step S500 of FIG. 4 in which the control process of the flow chart shown in FIG. 8 is executed.

In step S500, the controller 50 calculates a risk potential RP indicating the degree of convergence between the host vehicle and the obstacle, e.g., preceding vehicle, in front of the host vehicle. The term "risk potential" refers to the degree of risk or possibility of danger. In this embodiment, the risk potential is set to increase as the host vehicle and an obstacle existing in the vicinity of the host vehicle draw closer together. In other words, in this illustrated embodiment, the risk potential is a physical quantity that expresses how close the host vehicle and the obstacle are to each other, i.e., the degree to which the host vehicle and the obstacle have drawn near to each other (degree of convergence). The method of calculating the risk potential RP will now be described.

Figure 7:
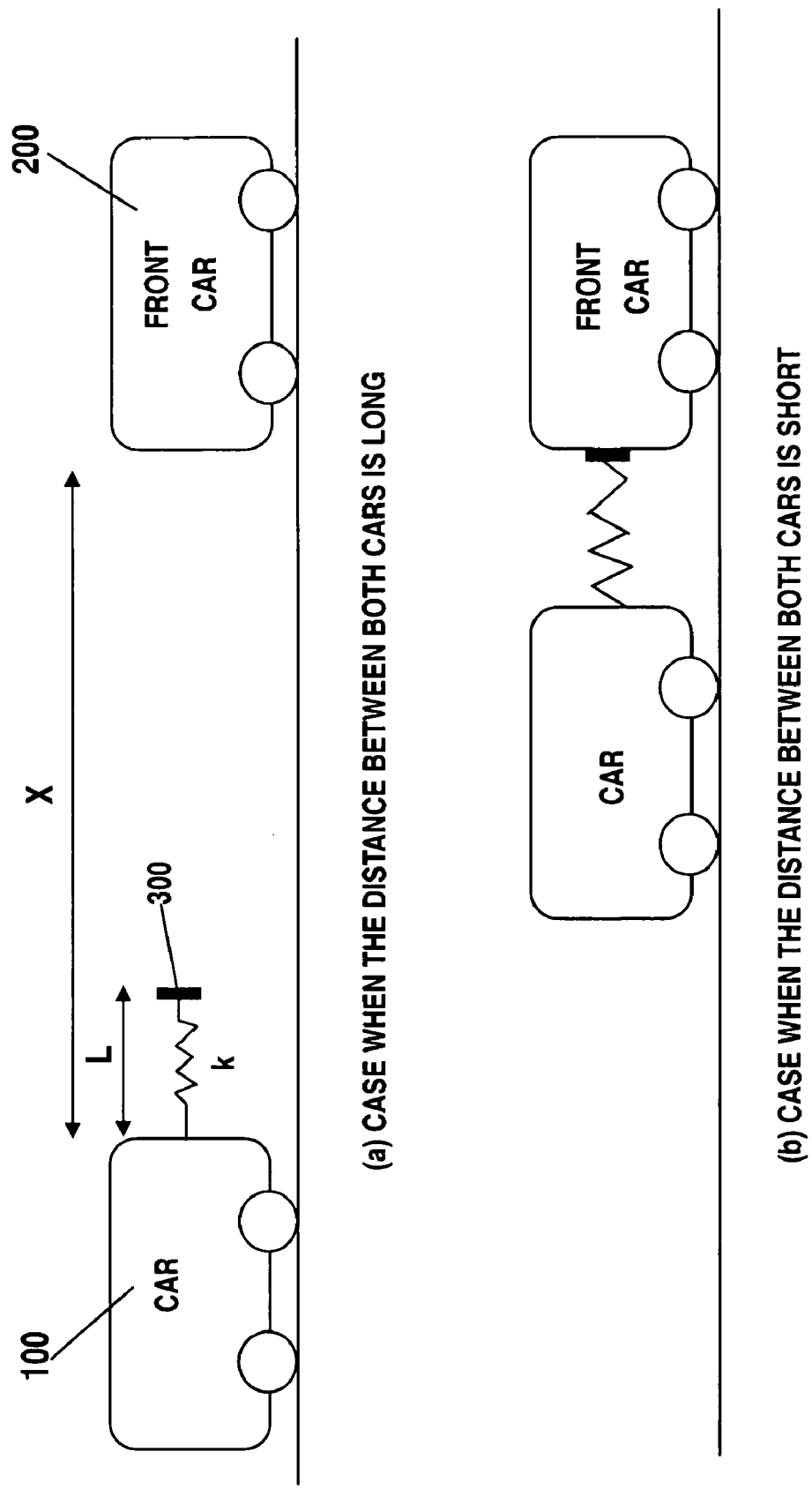
FIG. 7 is a series of graphs illustrating the concept of the risk potential of the vehicle in which the driving assist system is installed.

Referring first to FIG. 7, two cases are schematically modeled to explain method of calculating the risk potential RP. Consider a model in which it is assumed that an imaginary elastic body 300 is provided on the front of the host vehicle 100 in which the assist system 1 is installed, as shown in diagram (a) of FIG. 7. The imaginary elastic body 300 touches against the preceding vehicle 300 and is compressed, thereby generating a pseudo traveling resistance against the movement of the host vehicle 100. Here, the risk potential RP with respect to the obstacle is defined to be the spring force that results when, as shown in diagram (b) of FIG. 7, the imaginary elastic body 300 contacts the preceding vehicle 200 and is compressed. The method of calculating the risk potential RP will now be explained with reference to the flowchart of FIG. 8.

In step S501, the controller 50 determines if the control pattern selected in step S400 is Control Pattern 0 (Flg=0). If the selected control pattern is Control Pattern 0, i.e., the long control execution region, then the controller 50 proceeds to step S502 and sets the value Th0 used to determine if the control pattern was Control Pattern 0 as a time to contact threshold value Th for calculating the risk potential RP.

If the result of step S501 is negative, then the controller 50 proceeds to step S503 and determines if the current control pattern is Control Pattern 1 (Flg=1). If the selected control pattern is Control Pattern 1, i.e., the medium-length control execution region, then the controller 50 proceeds to step S504 and sets the value Th1 used to determine if the control pattern was Control Pattern 1 as the time to contact threshold value Th. If the result of step S503 is negative, then the controller 50 proceeds to step S505 and sets the threshold value Th2 as the time to contact threshold value Th. The threshold value Th2 is a prescribed value used for determining if the control pattern having the short control execution region, i.e., Control Pattern 2, should be selected. The threshold value Th2 is set in advance to an appropriate value that is less than threshold value Th1.

In step S506, the controller 50 determines if the time to contact TTC of the host vehicle with respect to the preceding vehicle calculated in step S400 is smaller than the time to contact threshold value Th set in step S502, S504, or S505. If the time to contact TTC is smaller than the time to contact threshold value Th, then the controller 50 proceeds to step S507 and calculates a reference length L indicating the length of the imaginary elastic body 300. The reference length L is calculated using Equation 2 shown below based on the time to contact threshold value Th and the relative velocity Vr of the host vehicle and the preceding vehicle.

$$L = Th \times Vr \qquad \text{(Equation 2)}$$

In step S508, the controller 50 uses the reference length L calculated in step S507 in Equation 3 shown below in order to calculate the risk potential RP of the host vehicle with respect to the preceding vehicle.

$$RP = K \times (L - X) \qquad \text{(Equation 3)}$$

In the equation, the term K is the spring constant of the imaginary elastic member 300. Thus, the shorter the following distance X of the host vehicle with respect to the preceding vehicle becomes, the more the imaginary elastic body 300 is compressed and the risk potential RP increases.

If the result of step S506 is negative and the time to contact TTC is equal to or larger than the time to contact threshold value Th, i.e., if the elastic body 300 is not contacting the preceding vehicle 200, as shown in diagram (a) of FIG. 7, the risk of contact between the host vehicle and the preceding vehicle is determined to be low and the risk potential RP is set to 0.

After the controller 50 calculates the risk potential RP in step S500, the controller 50 proceeds to step S600 of FIG. 4.

Figure 9:
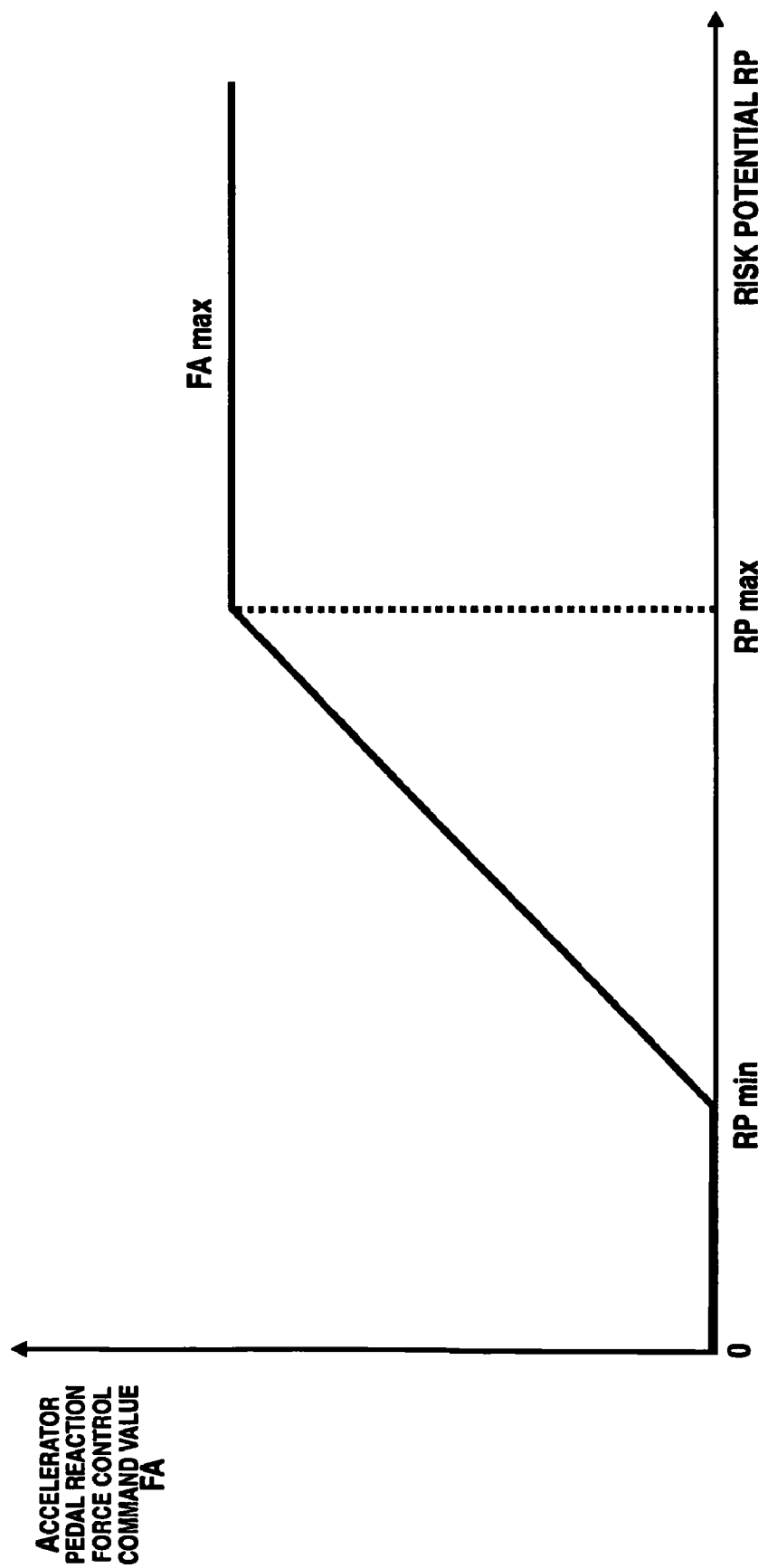
FIG. 9 is a plot of the accelerator pedal reaction force control amount versus the risk potential.

In step S600, the controller 50 calculates a reaction force control command value FA for the actuation reaction force to be exerted by (generated in) the accelerator pedal 72 based on the risk potential RP calculated in step S500. FIG. 9 is a plot of the accelerator pedal reaction force control command value FA versus the risk potential RP. As indicated in FIG. 9, when the risk potential is larger than a prescribed minimum value RPmin, the accelerator pedal reaction force control command value FA is calculated such that the generated accelerator pedal reaction force increases as the risk potential RP increases. When the risk potential RP is larger than a prescribed maximum value RPmax, the accelerator pedal reaction force control command value FA is held constant at a maximum value FAmax such that a maximum accelerator pedal reaction force is generated.

In step S700 of FIG. 4, the controller 50 sends the accelerator pedal reaction force control command value FA calculated in step S600 to the accelerator pedal reaction force control device 70. The accelerator pedal reaction force control device 70 controls the actuation reaction force exerted by the accelerator pedal 72 based on the command value received from the controller 50. After command value is sent, the current control loop ends.

Figure 10:
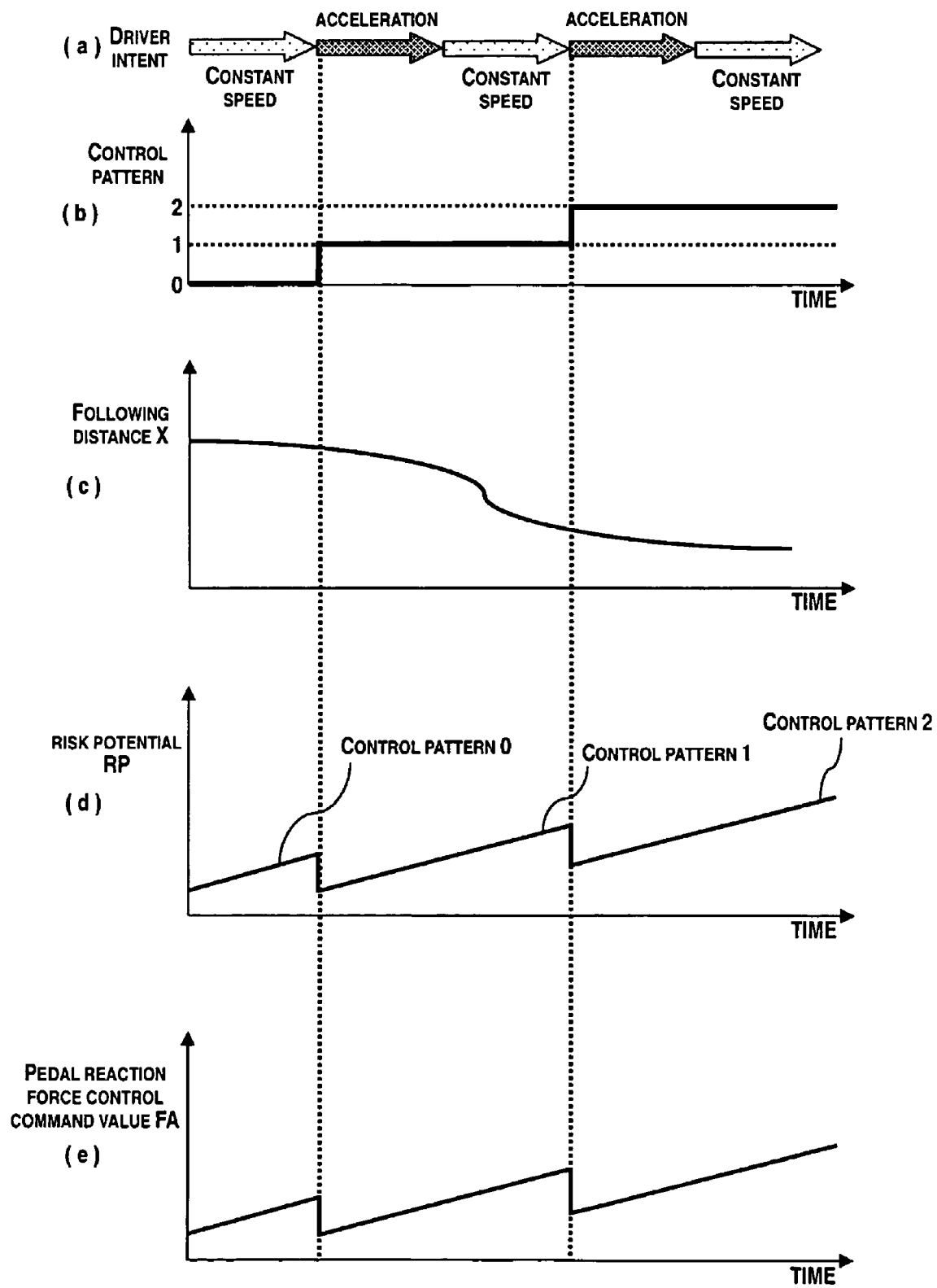
FIG. 10 is a series of graphs illustrating how the intent of the driver, the control pattern, the following distance, the risk potential, and the reaction force control command value change with time when the control pattern changes from Control Pattern 0 to Control Pattern 1 and then from Control Pattern 1 to Control Pattern 2.
Figure 11:
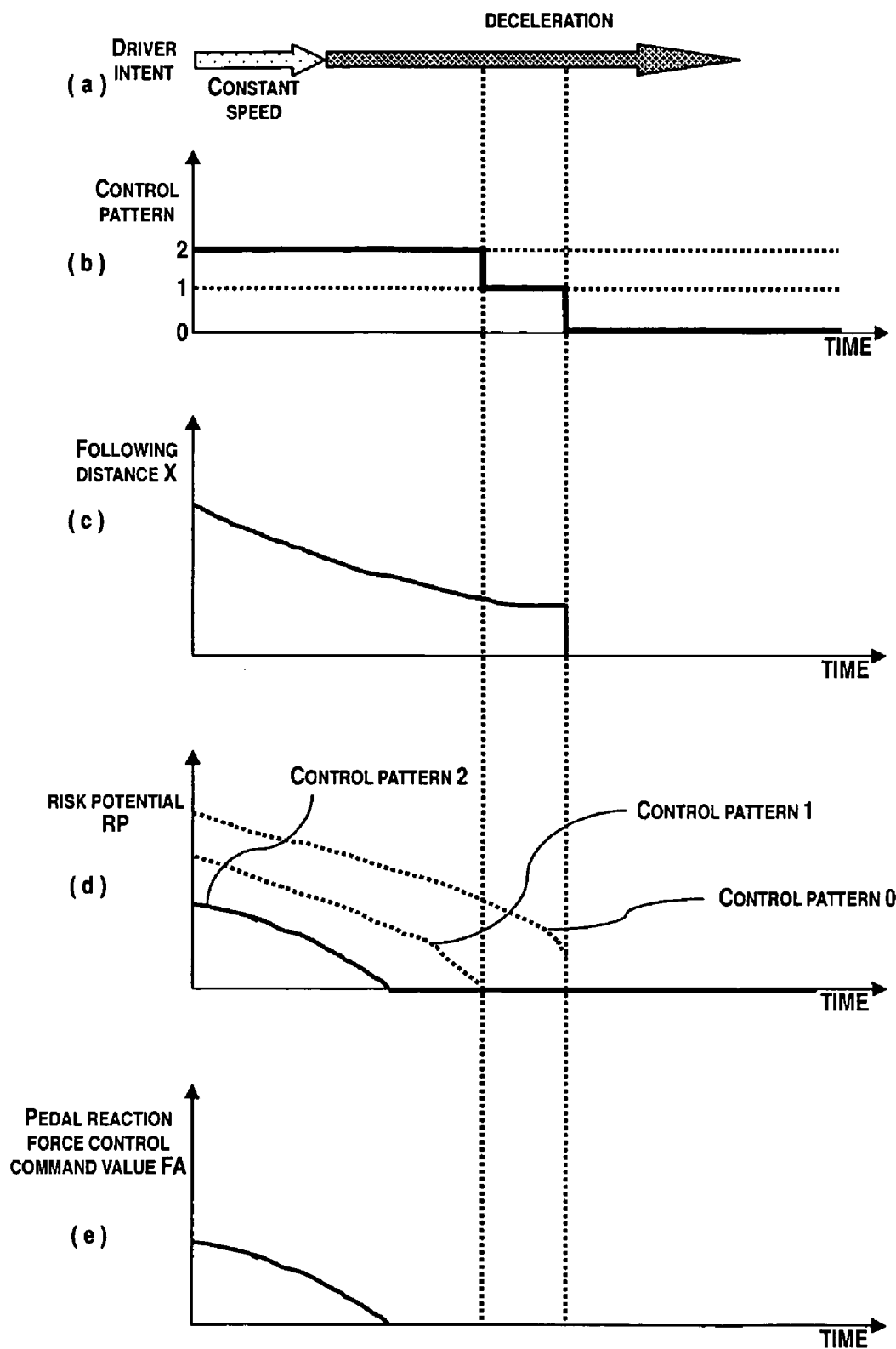
FIG. 11 is a series of graphs illustrating how the intent of the driver, the control pattern, the following distance, the risk potential, and the reaction force control command value change with time when the control pattern changes from Control Pattern 2 to Control Pattern 1 and from Control Pattern 1 to Control Pattern 0.

The operational effects of a vehicle driving assist system 1 in accordance with the first embodiment of the present invention will now be explained with reference to the drawings. FIG. 10 is a series of graphs illustrating how the intent of the driver, the control pattern, the following distance, the risk potential, and the reaction force control command value change with time when the control pattern changes from Control Pattern 0 to Control Pattern 1 and from Control Pattern 1 to Control Pattern 2. FIG. 11 is a series of graphs illustrating how the intent of the driver, the control pattern, the following distance, the risk potential, and the reaction force control command value change with time when the control pattern changes from Control Pattern 2 to Control Pattern 1 and from Control Pattern 1 to Control Pattern 0.

When traveling in a traffic jam or other congested traffic conditions, the driver operates the accelerator pedal 72 frequently in order to adjust the host vehicle speed Vh and the traveling distance X. When traveling in congestion, merging traffic, and other situations in which the following distance X must be short, the driver's ability to operate the accelerator pedal 72 would be impeded if the system determined that the degree of convergence with respect to a preceding vehicle was high and caused the accelerator pedal 72 to exert a large actuation reaction force. Therefore, the control pattern is changed automatically in order to avoid impeding the driver's ability to drive and becoming an annoyance in situations where the traveling distance X with respect to a preceding vehicle is naturally short, such as in congested traffic or merging traffic, and in situations where the driver deliberately shortens the traveling distance in order to pass a preceding vehicle.

The graph (a) of FIG. 10 indicates the driver's intent with respect to acceleration in a traffic situation like those mentioned above, i.e., congested traffic, merging traffic, or passing. The graph (b) of FIG. 10 shows how the control pattern changes from Control Pattern 0 to Control Pattern 1 and then from Control Pattern 1 to Control Pattern 2 when the driver intends to accelerate. As shown in graph (c) of FIG. 10, the following distance gradually shortens as the host vehicle approaches the preceding vehicle. Since the control pattern changes, i.e., the control execution region changes, the risk potential RP changes in a discontinuous manner as shown in graph (d) of FIG. 10.

Since the time to contact threshold value Th and the control execution region is different for each of the Control Patterns 0, 1 and 2, the risk potential RP starts rising at a different timing for each of the control patterns, as indicated with the dotted lines in graph (d) of FIG. 10. When Control Pattern 0 is set a risk potential RP corresponding to Control Pattern 0 is selected, and when Control Pattern 1 is set a risk potential RP corresponding to Control Pattern 1 is selected. Consequently, as shown in graph (d) of FIG. 10, the risk potential does not increase in a continuous manner but, rather, undergoes abrupt changes.

As shown in graph (e) of FIG. 10, the accelerator pedal reaction force control command value FA changes in accordance with the risk potential RP. As a result, the accelerator pedal actuation reaction force can be prevented from increasing excessively and becoming an annoyance to the driver or impeding the driver's ability to drive. Also, since the actuation reaction force changes in a discontinuous manner, the driver can readily recognize that the control pattern has changed.

When the driver has the intent to decelerate, it would seem odd if the accelerator pedal 72 continued to exert a large actuation reaction force. Thus, as shown in graph (a) of FIG. 11, when the driver exhibits the intent to decelerate, the control pattern is changed automatically based on the time to contact TTC of the host vehicle and the preceding vehicle. When the time to contact TTC increases beyond the threshold value Th1, the control pattern changes from Control Pattern 2 to Control Pattern 1. Then, when the time to contact TTC increases beyond the threshold value Th0, the control pattern is changed again from Control Pattern 1 to Control Pattern 0. In this way, the control pattern is gradually changed to the control pattern with the long control execution region. The portion of graph (c) of FIG. 11 where the following distance changes abruptly indicates a situation in which an obstacle is no longer detected.

The risk potential RP in accordance with Control Pattern 2 is selected when Control Pattern 2 is being used, the risk potential RP in accordance with Control Pattern 1 is selected when Control Pattern 1 is being used, and the risk potential RP in accordance with Control Pattern 0 is selected when Control Pattern 0 is being used. Thus, after the risk potential RP used for control decreases to 0 as indicated with the solid-line curve in graph (d) of FIG. 11, it remains at 0 (RP=0).

As shown in graph (e) of FIG. 11, the accelerator pedal reaction force control command value FA changes in accordance with the risk potential RP. As a result, when the driver is attempting to decelerate, the accelerator pedal actuation reaction force can be decreased rapidly so that the actuation reaction force control is well-matched to what the driver would expect to feel. Also, the control pattern is changed to the control pattern having the longest control execution region, i.e., Control Pattern 0, when an obstacle ceases to be detected. As a result, when a new obstacle is detected, the risk potential RP can be calculated at an early timing and the driver can be informed earlier regarding the existence of the new obstacle.

Basically, the operational effects of the first embodiment will now described. The controller 50 of the vehicle driving assist system 1 detects the host vehicle speed Vh of the host vehicle in which the system is installed and the following distance X of the host vehicle with respect to an obstacle existing in front of the host vehicle, and, based on these detected quantities, the controller 50 calculates a positional relationship between the host vehicle and the obstacle. Additionally, the controller 50 detects the state of actuation of the accelerator pedal 72 (which is a driver-operated device used by the driver in order to drive the host vehicle) by the driver and selects the control pattern from among a plurality of control patterns based on the accelerator pedal actuation state and the positional relationship of the host vehicle with respect to the obstacle. The controller 50 then calculates the risk potential RP that indicates the degree of convergence between the host vehicle and the obstacle. The calculation is based on the following distance X and the host vehicle speed Vh and is executed in accordance with the selected control pattern. Based on the calculated risk potential RP, the controller 50 then controls the actuation reaction force exerted by the accelerator pedal 72 and/or the braking/driving force exerted against the host vehicle. In the first embodiment, the actuation reaction force of the accelerator pedal 72 is controlled. More specifically, the actuation reaction force of the accelerator pedal 72 is controlled in accordance with the actuation state of the accelerator pedal 72 (which varies depending on the traffic situation surrounding the host vehicle) and the positional relationship between the host vehicle and the obstacle. As a result, the system can select an appropriate control pattern and accomplish both the task of transmitting information to the driver via the actuation reaction force and the task of reducing the annoyance to the driver caused by generating an actuation reaction force that is opposed to the intent of the driver.

The intent detecting unit 53 of the controller 50 predicts if the intent of the driver is to accelerate, decelerate, or travel at constant speed based on the actuation state of the accelerator pedal 72 by the driver. Each of the control patterns has a different control execution region and the control pattern selecting unit 54 of the controller 50 is configured to select the control pattern using the intent of the driver predicted based on the accelerator pedal actuation state. As a result, a control pattern that takes into consideration the driver's intent can be selected and the actuation reaction force can be controlled appropriately.

If the intent detecting unit 52 predicts that the driver intends to accelerate, the control pattern selecting unit 54 selects a control pattern having a shorter control execution region than the current control pattern. When the driver exhibits the intent to accelerate and is approaching near to an obstacle, the control pattern selecting unit 54 selects a control pattern having a short control execution region so as not to execute actuation reaction force control until the possibility (chances) of contact between the host vehicle and the obstacle becomes high. In this way, the system avoids impeding the driving operations executed by the driver, i.e., operation of the accelerator pedal 72 by the driver. Meanwhile, if the chances of contact become high, then the controller 50 can cause the accelerator pedal 72 to exert a large actuation reaction force to alert the driver and reduce the chances of contact.

If the intent detecting unit 52 predicts that the driver intends to decelerate and the positional relation which between the host vehicle and the obstacle is changing in the direction of increasing distance between the host vehicle and the obstacle, then the control pattern selecting unit 54 selects a control pattern having a control execution region that is longer than the current control execution region. As a result, when the driver is attempting to decelerate, the control execution region gradually becomes longer and actuation reaction force control that is well-matched to what the driver would expect to feel can be accomplished.

When an obstacle that has been detected by the laser radar 10 (traveling situation detecting section) ceases to be detected anymore, the control pattern selecting unit 54 selects the control pattern having the longest control execution region. As a result, the next time an obstacle begins being detected, the actuation reaction force control can be commenced at an early stage.

The controller 50 uses the following distance X and the relative velocity Vr as the positional relationship between the host vehicle and the obstacle and calculates the time to contact TTC of the host vehicle and the obstacle based on the following distance X and the relative velocity Vr. The control execution region is defined to be the length of the time to contact TTC. Thus, the control pattern can be selected appropriately in view of the driver's driving characteristics in congested traffic, merge situations, passing situations, and various other traffic situations.

Second Embodiment

Referring now to FIGS. 12 to 25, a vehicle driving assist system in accordance with a second embodiment will now be explained. In view of the similarity between the first and second embodiments, the parts of the second embodiment that are identical to the parts of the first embodiment will be given the same reference numerals as the parts of the first embodiment. In other words, the parts illustrated in FIGS. 12 and 13 that have the same functions as the parts of the first embodiment shown in FIGS. 1 and 2 are indicated with the same reference numerals. Moreover, the descriptions of the parts of the second embodiment that are identical to the parts of the first embodiment may be omitted for the sake of brevity. Thus, the second embodiment will be explained chiefly by describing its differences with respect to the first embodiment. Unless indicated to the contrary, the descriptions of the parts of the first embodiment applies to the second embodiment.

Figure 12:
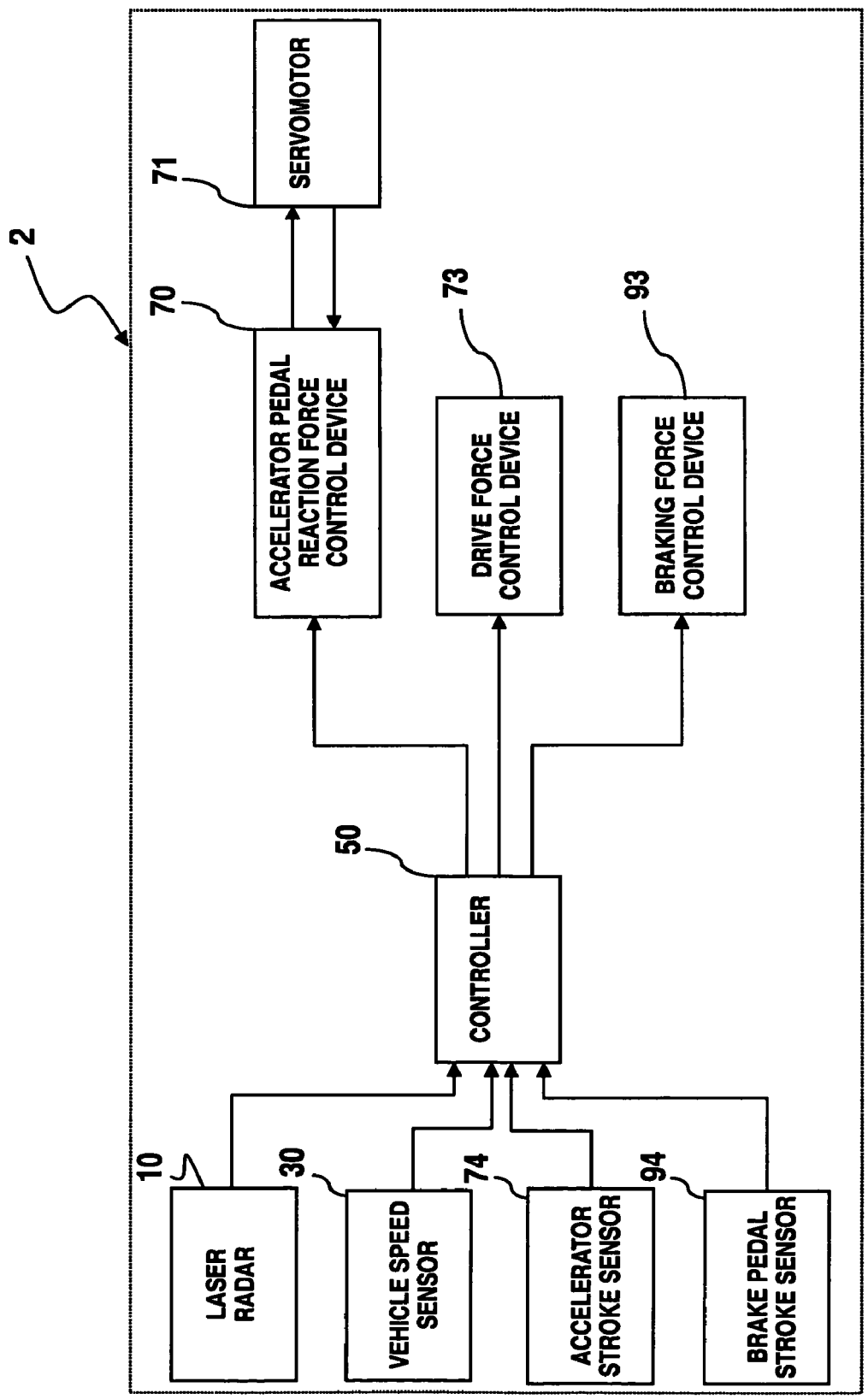
FIG. 12 is a system diagram of a vehicle driving assist system in accordance with a second embodiment of the present invention.
Figure 13:
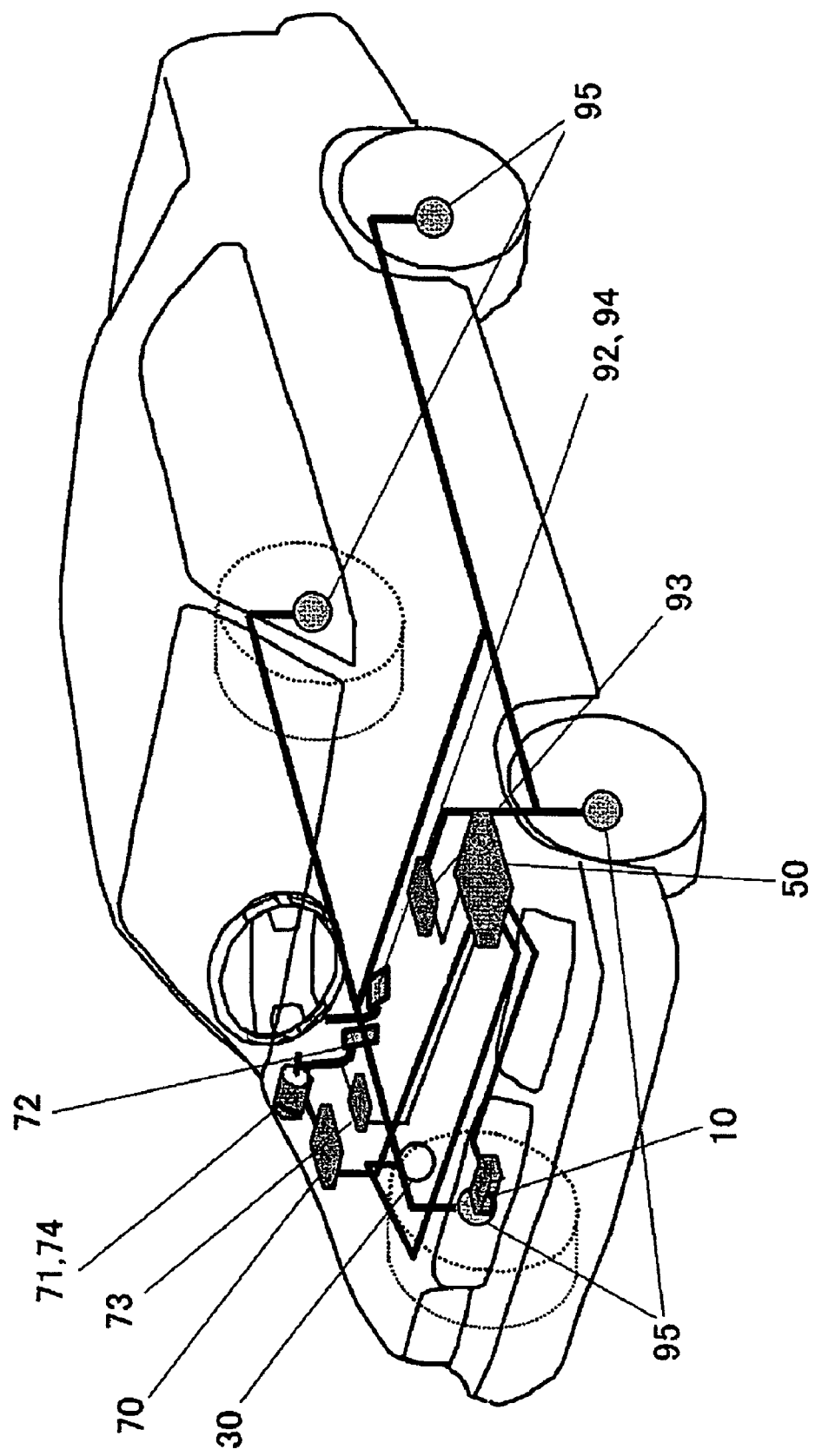
FIG. 13 is a schematic view of a vehicle in which the vehicle driving assist system shown in FIG. 12 is installed in accordance with the second embodiment of the present invention.

FIG. 12 is a system diagram showing a vehicle driving assist system 2 in accordance with the second embodiment, while FIG. 13 is a schematic view of a host vehicle having the vehicle driving assist system 2 shown in FIG. 12 installed therein. As shown in FIG. 12, the vehicle driving assist system 2 is further provided with a driving force control device or section 73 configured to control a driving force exerted against the host vehicle, a braking force control device or section 93 configured to control a braking force exerted against the host vehicle, and a brake pedal stroke sensor 94 (brake pedal stroke detecting section). The brake pedal stroke sensor 94 detects the depression amount (actuation amount) of the brake pedal 92. The brake pedal stroke sensor 94 outputs the detected brake pedal actuation amount to a controller 50A that is the same as the controller 50, but with different programming.

Figure 14:
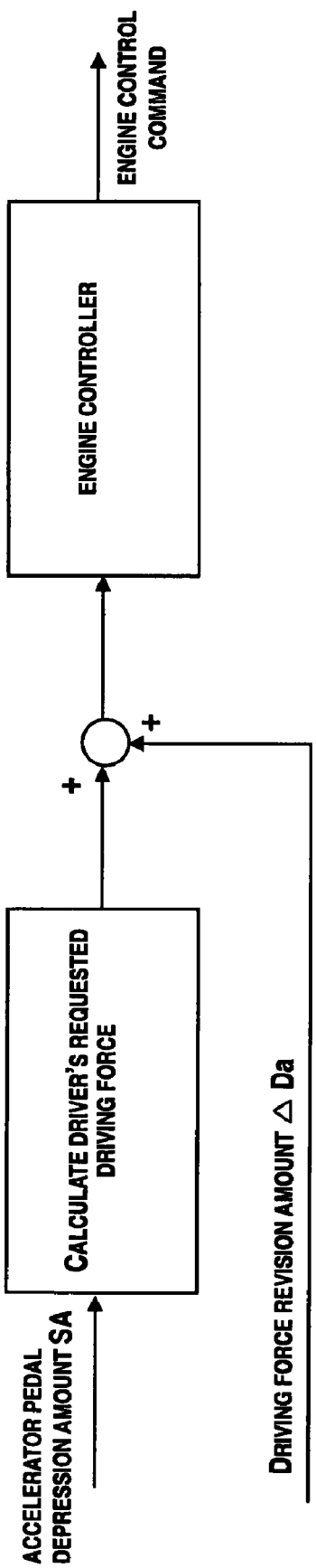
FIG. 14 is a diagram for explaining the general concept of the driving force control in accordance with the second embodiment of the present invention.
Figure 15:
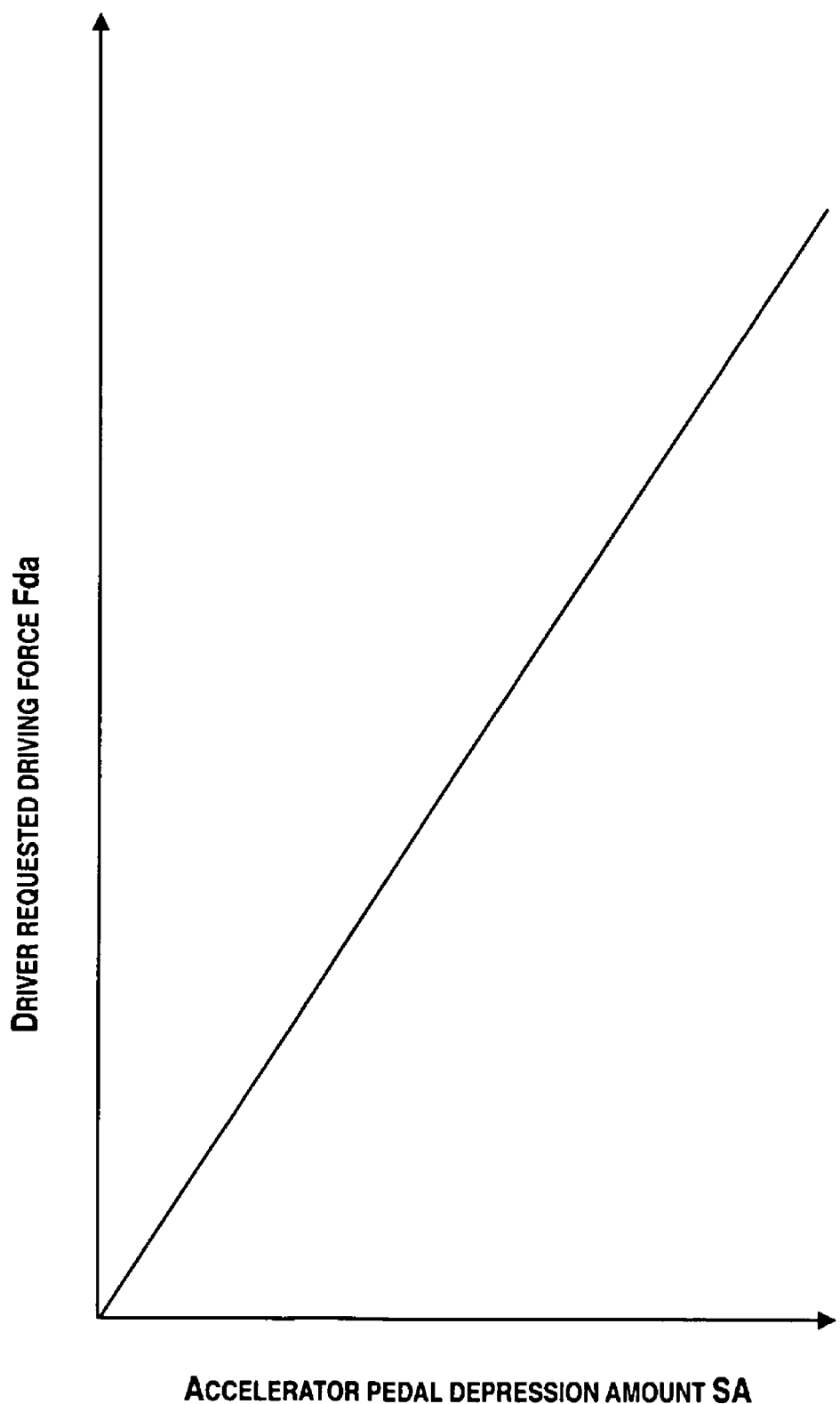
FIG. 15 is a plot of the requested driving force versus the accelerator pedal depression amount in accordance with the second embodiment of the present invention.

The driving force control device 73 is configured to calculate a control command for the engine. FIG. 14 is a block diagram of the driving force control executed by the driving force control device 73. FIG. 15 is a characteristic map plotting the driver's requested driving force Fda versus the accelerator pedal actuation amount SA. The driving force control device 73 uses a map like that shown in FIG. 15 to calculate the driver's requested driving force Fda based on the accelerator pedal actuation amount SA. The driving force control device 73 adds a driving force revision amount ΔDa (explained later) to the driver's requested driving force Fda so as to calculate a target driving force. The driving force control device 73 has an engine controller that calculates a control command for the engine based on the target driving force.

Figure 16:
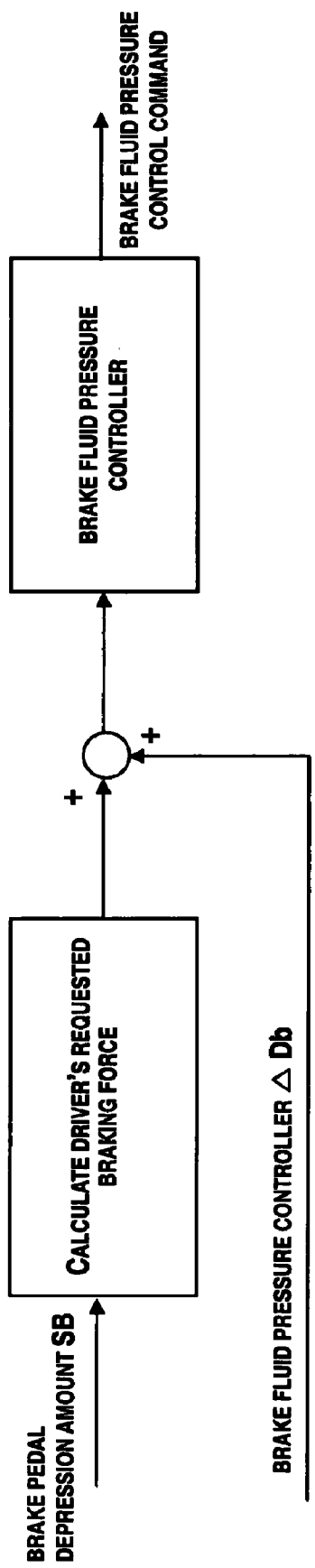
FIG. 16 is a diagram for explaining the general concept of the braking force control in accordance with the second embodiment of the present invention.
Figure 17:
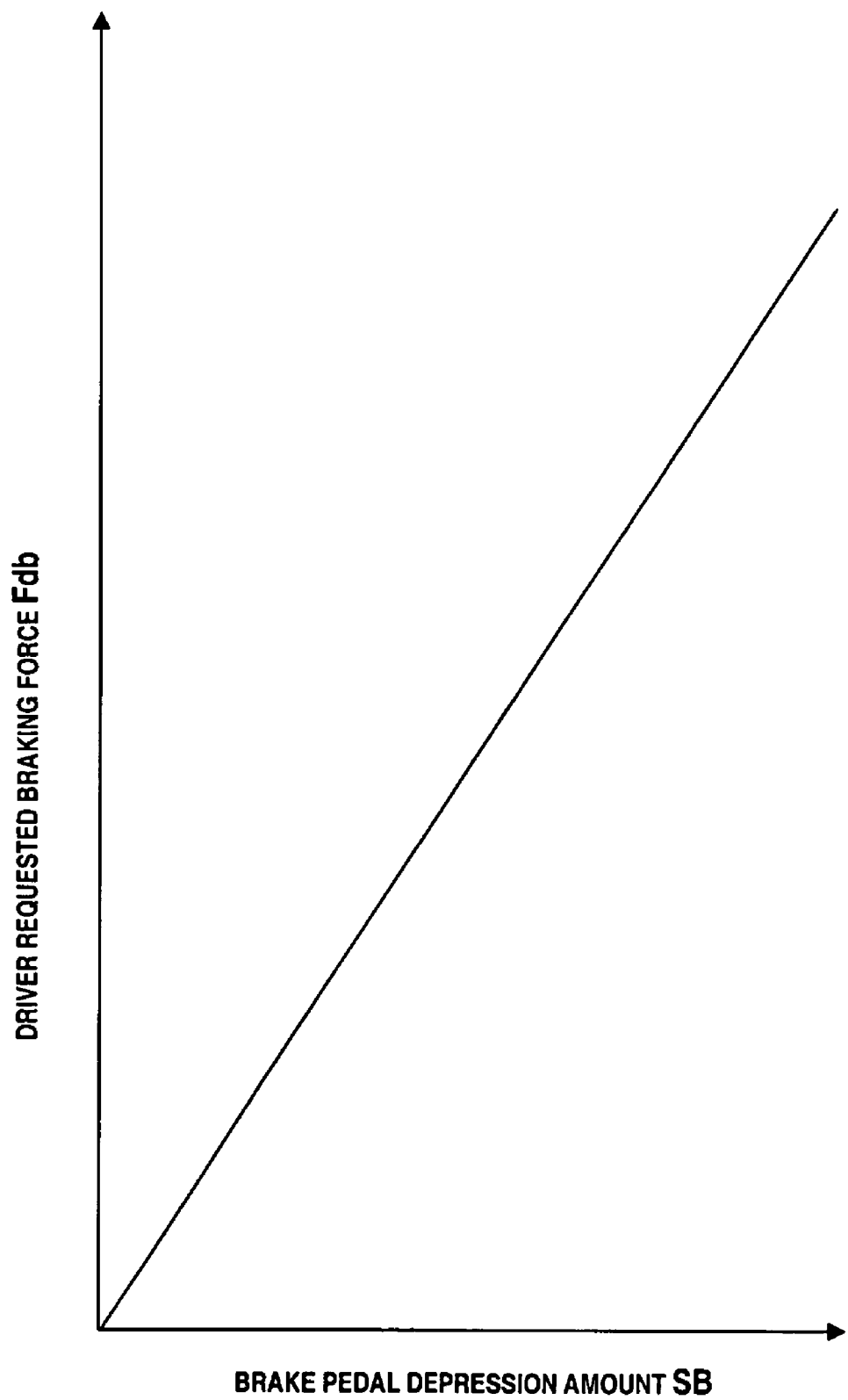
FIG. 17 is a plot of the requested braking force versus the brake pedal depression amount in accordance with the second embodiment of the present invention.

The braking force control device 93 is configured to output a brake fluid pressure command. FIG. 16 is a block diagram of the braking force control executed by the braking force control device 93. FIG. 17 is a characteristic map plotting the driver's requested braking force Fdb versus the brake pedal actuation amount SB. The driving force control device 93 uses a map like that shown in FIG. 17 to calculate the driver's requested braking force Fdb based on the brake pedal actuation amount SB. The driving force control device 93 adds a braking force revision amount ΔDb (explained later) to the driver's requested driving force Fdb so as to calculate a target braking force. The braking force control device 93 has a brake fluid pressure controller configured to output a brake fluid pressure command based on the target braking force. A brake device 95 is provided on each of the wheels of the host vehicle. The brake devices 95 operate in accordance with a control command issued from the brake fluid pressure controller.

Figure 18:
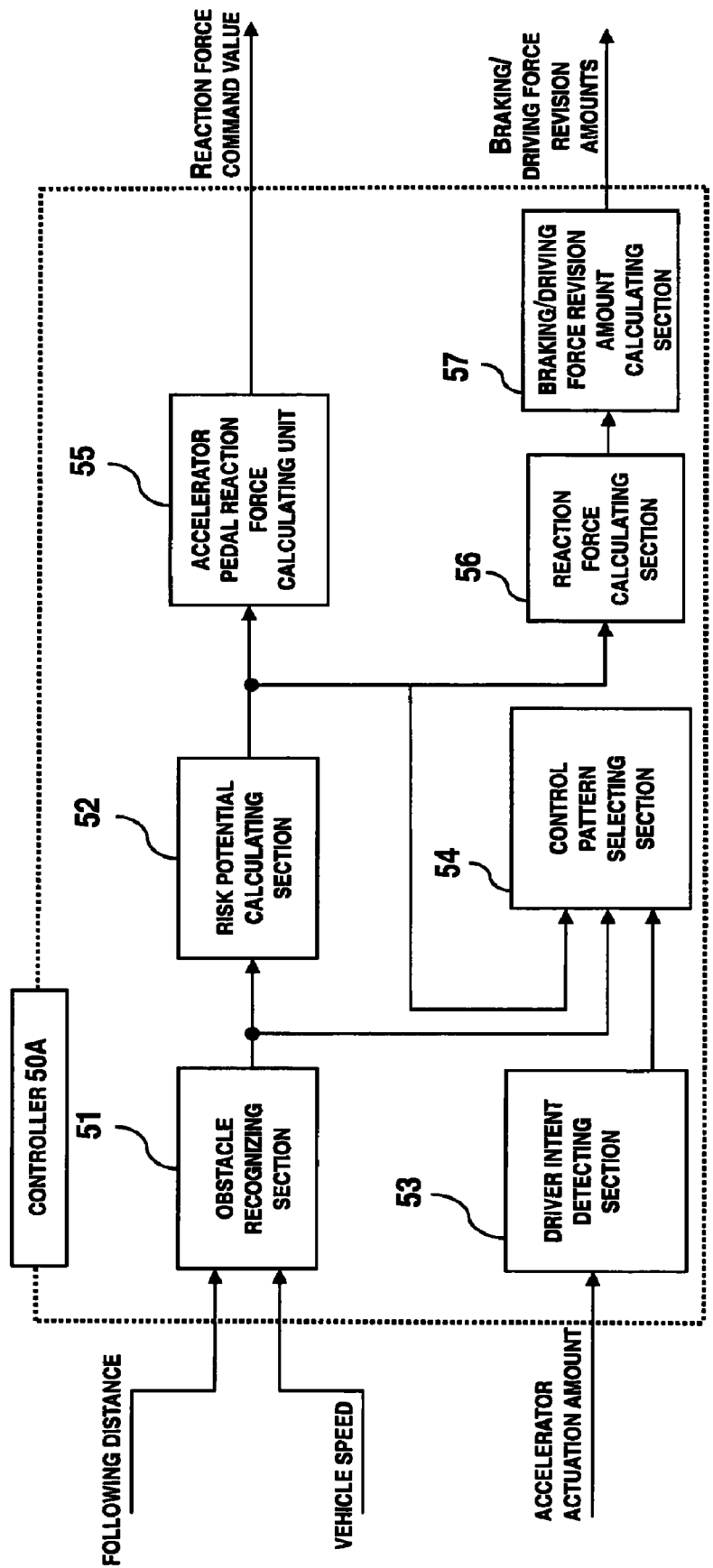
FIG. 18 is a block diagram showing the internal components of the controller in accordance with the second embodiment of the present invention.

FIG. 18 is a simplified block diagram of the internal and peripheral components of the controller 50A. The controller 50A preferably includes a microcomputer with a control program that controls the system 2 in a manner as discussed below. The controller 50A can also include other conventional components such as an input interface circuit, an output interface circuit, and storage devices such as a ROM (Read Only Memory) device and a RAM (Random Access Memory) device. Thus, the internal and peripheral components of the controller 50A are configured such that the controller 50 includes an obstacle recognizing unit or section 51, a risk potential calculating unit or section 52, an intent detecting unit or section 53, a control pattern determining unit or section 54, an accelerator pedal reaction force calculating unit or section 55, a repelling force calculating unit or section 56, and a braking/driving force revision amount calculating unit or section 57.

Based on the risk potential RP, the repelling force calculating unit 56 calculates a reference repelling force for calculating a driving force revision amount ΔDa and a braking force revision amount ΔDb. The braking/driving force revision amount calculating unit 57 calculates the revision amounts (ADa and ΔDb) for the braking and driving forces exerted against the host vehicle based on the repelling force selected by the repelling force calculating unit 56.

Figure 19:
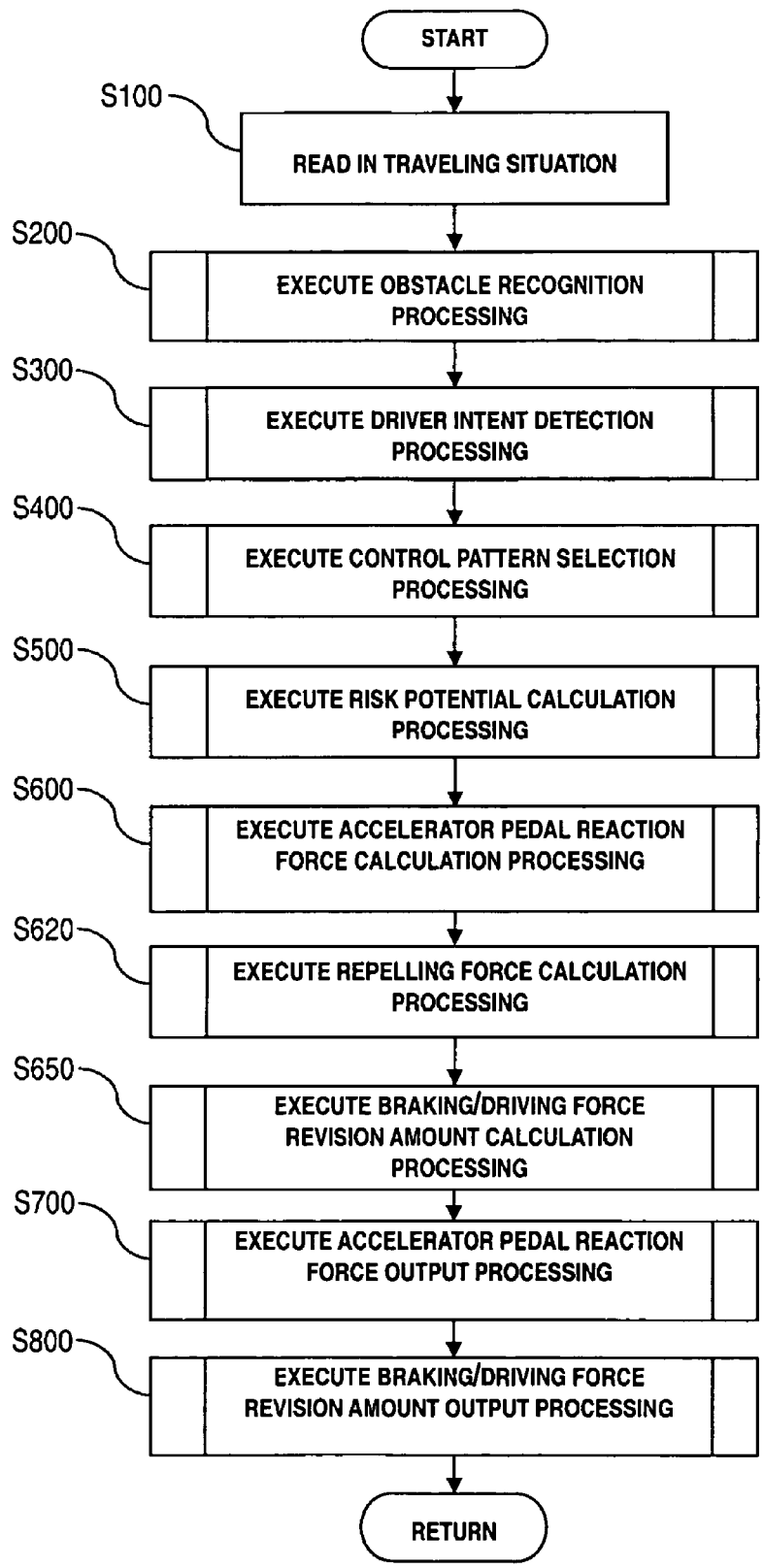
FIG. 19 is a flowchart showing the processing steps of a driving assistance control program in accordance with the second embodiment of the present invention.
Figure 20:
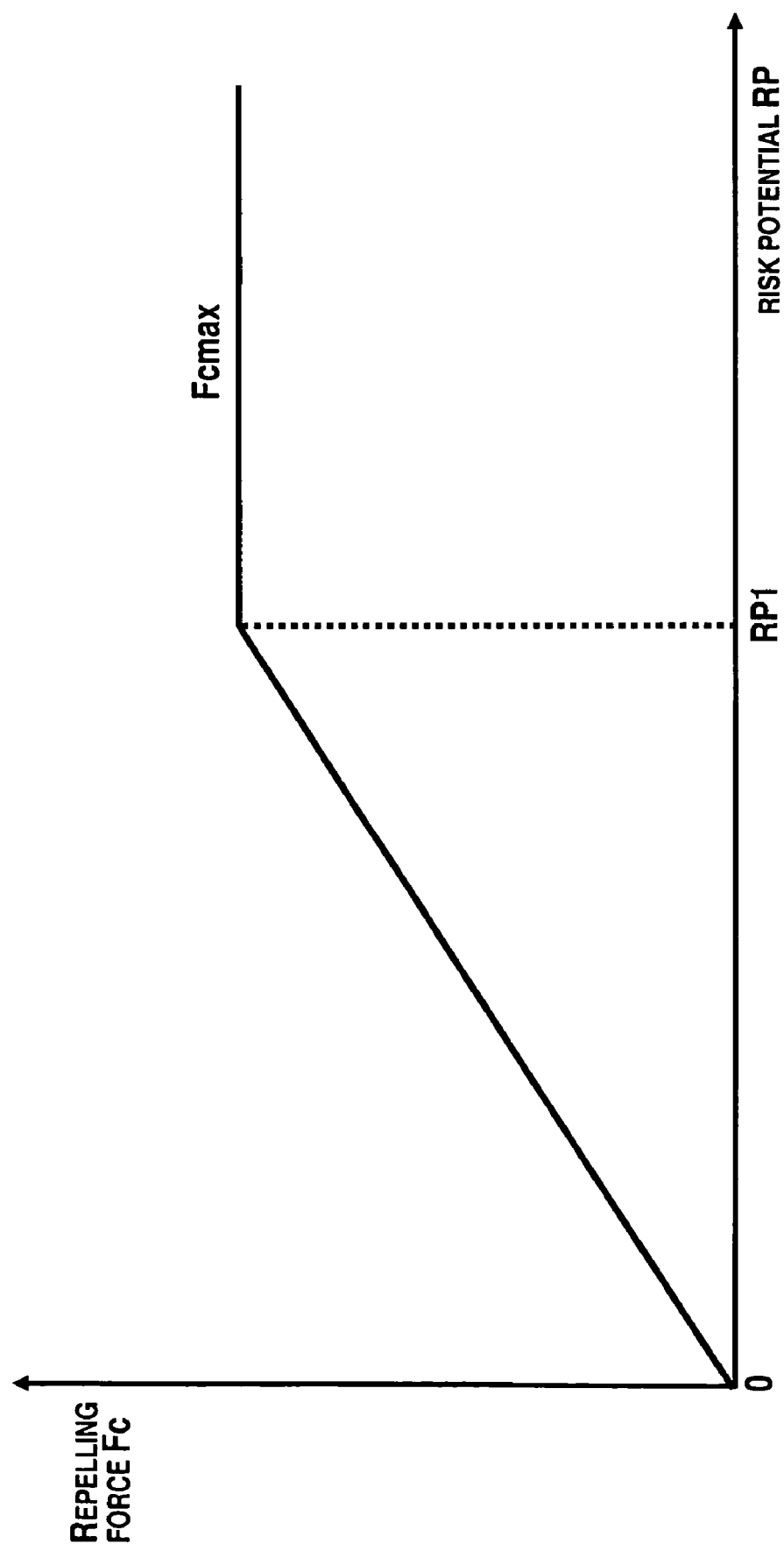
FIG. 20 is a plot of the repelling force versus the risk potential.

The operation of a vehicle driving assist system 2 in accordance with the second embodiment will now be explained with reference to FIG. 19. FIG. 19 is a flowchart showing the control processing steps of the driving assistance control executed by the controller 50A in the second embodiment. This control loop is executed continuously once per prescribed time period, e.g., every 50 msec. The control processing of the steps S100 to S600 is the same as in the flowchart shown in FIG. 4 and explanations of those steps are omitted for the sake of brevity.

In step S620, the controller 50A calculates a repelling force Fc to be used for calculating the driving force revision amount ΔDa and the braking force revision amount ΔDb. The calculation of the repelling force Fc is based on the risk potential RP calculated in step S500. The repelling force Fc can be thought of as the spring force of the imaginary elastic body 300 shown in diagrams (a) and (b) of FIG. 7. The repelling force Fc is calculated according to a relationship like that shown in FIG. 20 such that the larger the risk potential RP is, the larger the calculated value of the repelling force Fc becomes. When the risk potential RP exceeds a prescribed value RP 1, the repelling force Fc becomes fixed at a maximum value Fcmax.

In step S650 of FIG. 19, the controller 50A calculates the driving force revision amount ΔDa for revising the driving force exerted against the host vehicle and the braking force revision amount ΔDb for revising the braking force exerted against the host vehicle. The calculations are based on the repelling force Fc calculated in step S620. The control processing executed in order to calculate the revision amounts ΔDa and ΔDb in FIG. 19 will now be explained with reference to the flowchart of FIG. 21.

Figure 21:
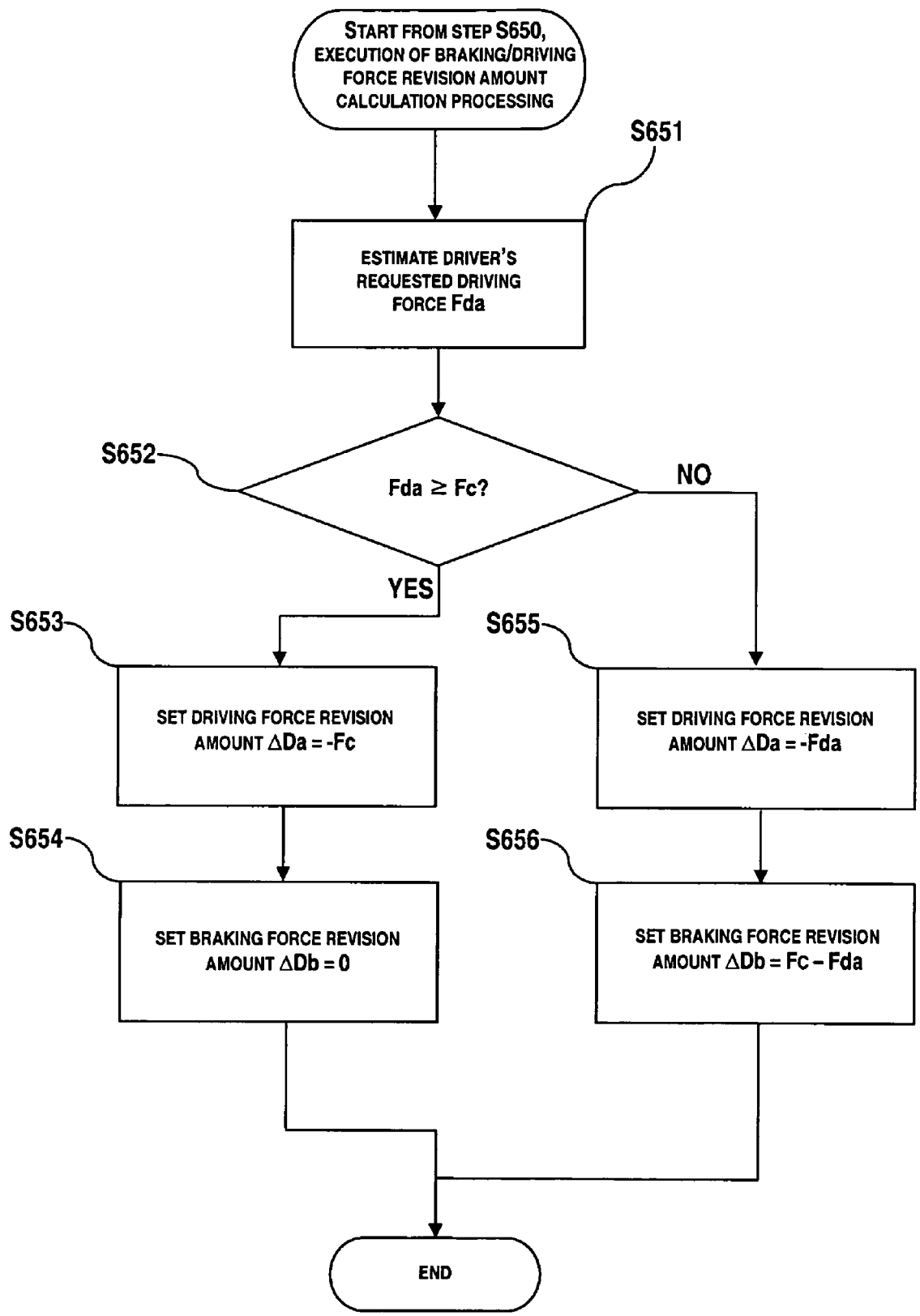
FIG. 21 is a flowchart for explaining the processing steps executed in order to calculate the driving force revision amount and the braking force revision amount.

In step S651 of FIG. 21, the controller 50A predicts the driver's requested drive force Fda. A map like that shown in FIG. 15 is stored in the controller 50A and the driver's requested driving force Fda is predicted based on the accelerator pedal actuation amount SA by referring to the map.

In step S652, the controller 50A compares the driver's requested driving force Fda predicted in step S651 to the repelling force Fc calculated in step S620. If the driver's requested driving force Fda is equal to or larger than the repelling force Fc (Fda≧Fc), then the controller 50A proceeds to step S653. In step S653, the controller 50A sets the driving force revision amount ΔDa to the value−Fc. The controller 50A then sets the braking force revision amount ΔDb to 0 in step S654.

In other words, since the difference Fda−Fc is equal to or larger than 0 (Fda−Fc≧0), a positive driving force will remain even after the driving force Fda is revised based on the repelling force Fc. Thus, the required revision amount output can be accomplished with only the driving force control device 73 outputting a revision amount. When this control is executed, the host vehicle will behave in such a fashion that the full driving force expected by the driver will not be delivered even though the driver is depressing the accelerator pedal 72. If the revised driving force is larger than the traveling resistance, the driver will feel the host vehicle exhibit more sluggish acceleration behavior. If the revised driving force is smaller than the traveling resistance, the driver will feel the host vehicle decelerate.

Meanwhile, if the result of step S652 is negative, i.e., if the driver's requested driving force Fda is smaller than the repelling force Fc (Fda<Fc), the targeted revision amount cannot be obtained with revision amount output from the driving force control device 73 alone. Therefore, the controller 50A proceeds to step S655 and sets the driving force revision amount ΔDa to −Fda. Then, in step S656, the controller sets 50A the braking force revision amount ΔDb to the amount by which the revision amount ΔDa is insufficient (Fc−Fda). The driver perceives this control as deceleration behavior of the host vehicle.

Figure 22:
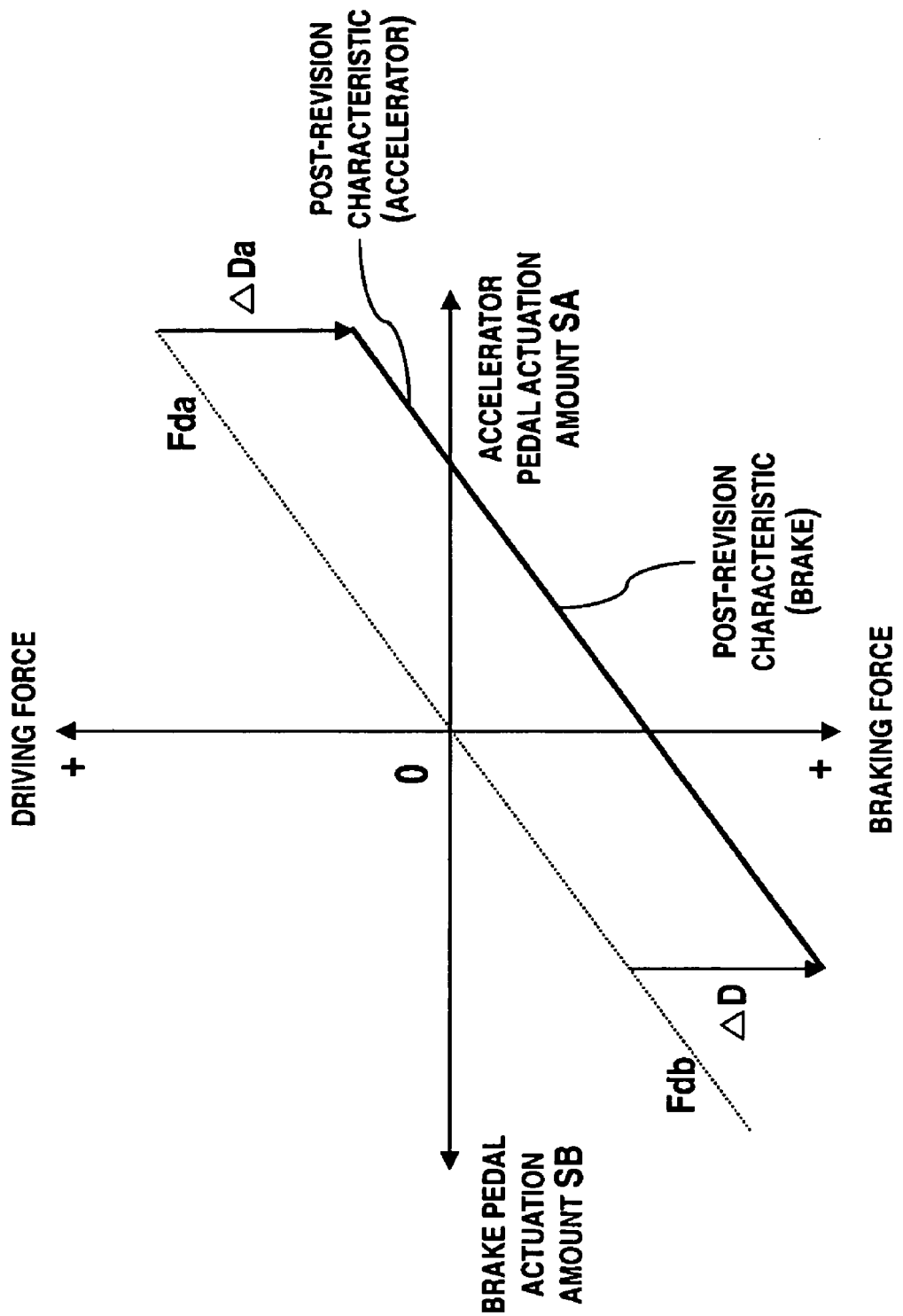
FIG. 22 is a characteristic curve plot for explaining how the driving force and the braking force are revised.

FIG. 22 is a diagram for explaining the method of revising the driving force and the braking force. The horizontal axis of FIG. 22 indicates the accelerator pedal actuation amount SA and the brake pedal actuation amount SB. The accelerator pedal actuation amount SA increases as one moves to the right from the origin 0 and the brake pedal actuation amount SB increases as one moves to the left from the origin 0. The vertical axis of FIG. 22 indicates the driving force and the braking force. The driving force increases as one moves upward from the origin 0 and the braking force increases as one moves downward from the origin 0. The single-dot chain line in FIG. 22 indicates the requested driving force Fda versus the accelerator pedal actuation amount SA and the requested braking force Fdb versus the brake pedal actuation amount SB. The revised driving force and braking force (revised based on the repelling force Fc) are indicated with a solid line.

When the accelerator pedal actuation amount SA is large and the requested driving force Fda corresponding to the accelerator pedal actuation amount SA is equal to or larger than the repelling force Fc, the driving force is reduced by the revision amount ΔDa. Meanwhile, when the accelerator pedal actuation amount SA is small and the requested driving force Fda corresponding to the accelerator pedal actuation amount SA is smaller than the repelling force Fc, the revision amount ΔDa is set to such a value that the driving force will be reduced to zero and the driving force is revised by the revision amount ΔDa. The difference between the repelling force Fc and the requested driving force Fda is set as the revision amount ΔDb. As a result, the light braking is executed in accordance with the accelerator pedal actuation amount SA.

When the brake pedal 92 is depressed, the braking force is increased based on the revision amount ΔDb. As a result, the braking/driving force characteristic is revised in such a fashion that the total travel resistance of the host vehicle is increased by the revision amount, i.e., by an amount equivalent to the repelling force Fc of the imaginary elastic body.

After the controller 50A calculates the driving force revision amount ΔDa and the braking force revision amount ΔDb in step S650 of FIG. 19 by executing the process of the flow chart in FIG. 21, the controller 50 proceeds to step S700 of FIG. 19. In step S700, the controller 50A sends the accelerator pedal reaction force command value FA calculated in step S600 to the accelerator pedal reaction force control device 70. The accelerator pedal reaction force control device 70 controls the actuation reaction force exerted by the accelerator pedal 72 based on the command value received from the controller 50A.

In step S800, the controller 50A sends the driving force revision amount ΔDa and braking force revision amount ΔDb calculated in step S650 to the driving force control device 73 and the braking force control device 93, respectively. The driving force control device 73 calculates a target driving force based on the driving force revision amount ΔDa and the requested driving force Fda and controls the engine controller such that the calculated target driving force is generated. The braking force control device 93 calculates a target braking force based on the braking force revision amount ΔDb and the requested braking force Fdb and controls the brake fluid pressure controller such that the target braking force is generated. After the command values are sent, the current control loop ends.

Figure 23:
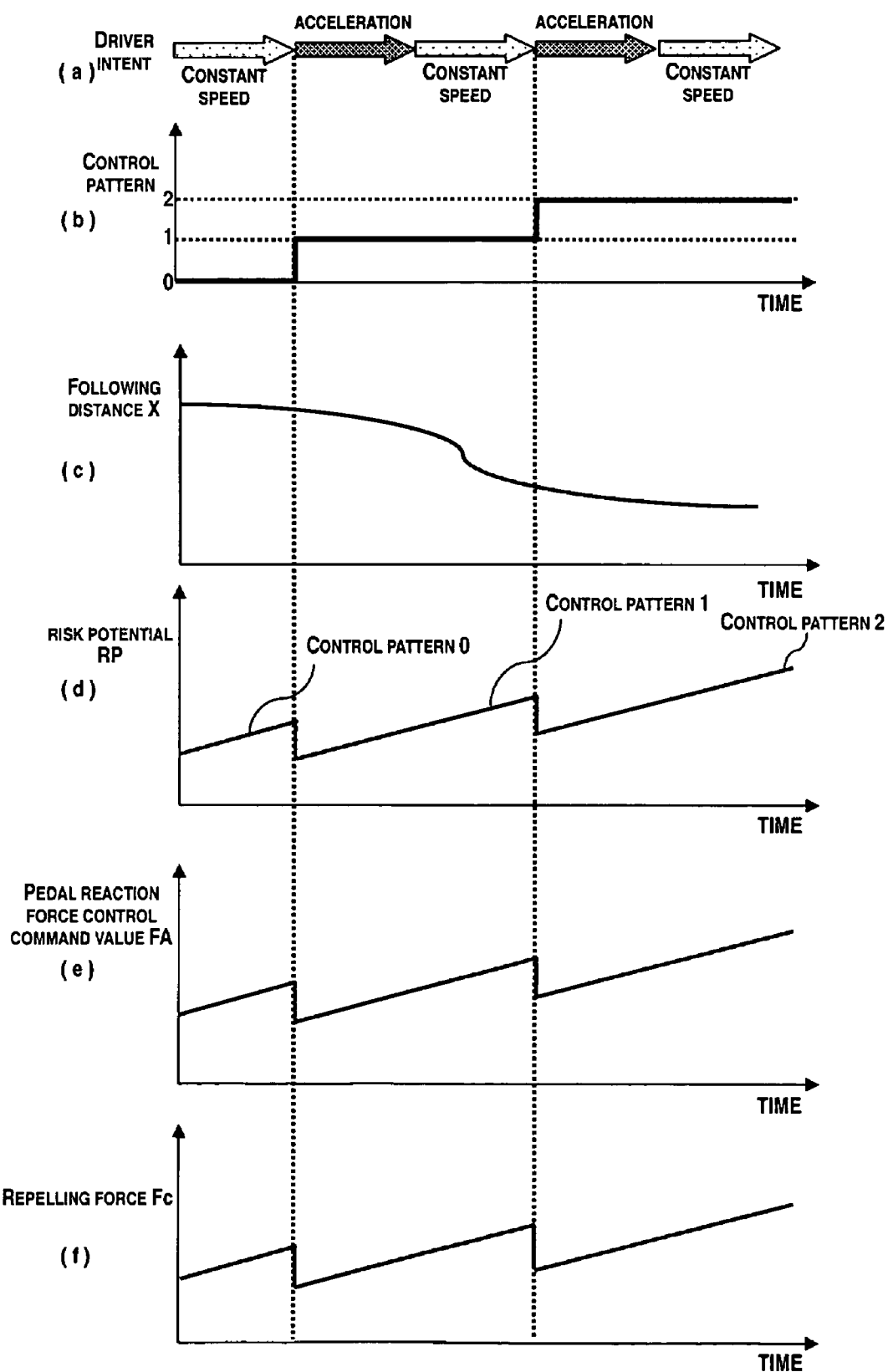
FIG. 23 is a series of graphs illustrating how the intent of the driver, the control pattern, the following distance, the risk potential, the reaction force control command value, and the repelling force change with time when the control pattern changes from Control Pattern 0 to Control Pattern 1 and from Control Pattern 1 to Control Pattern 2.

The operational effects of a vehicle driving assist system 2 in accordance with the second embodiment of the present invention will now be explained with reference to the drawings. The graphs (a) to (f) of FIG. 23 illustrate how the intent of the driver, the control pattern, the following distance X, the risk potential RP, the accelerator pedal reaction force control command value FA, and the repelling force Fc change with time when the control pattern changes from Control Pattern 0 to Control Pattern 1 and then from Control Pattern 1 to Control Pattern 2. The graphs (a) to (f) of FIG. 24 illustrate how the intent of the driver, the control pattern, the following distance X, the risk potential RP, the accelerator pedal reaction force control command value FA, and the repelling force Fc change with time when the control pattern changes from Control Pattern 2 to Control Pattern 1 and from Control Pattern 1 to Control Pattern 0.

When the control pattern changes from Control Pattern 0 to Control Pattern 1 and then to Control Pattern 2, the risk potential RP and the accelerator pedal reaction force control command value FA change in a discontinuous manner in response to the changes in control pattern, as shown in graphs (d) and (e) of FIG. 23. Accordingly, the repelling force Fc also changes in a discontinuous manner as shown in graph (f) of FIG. 23. As a result, since the driving force acting on the host vehicle does not fall too low and cause excessive deceleration to occur, the driving assistance control can be prevented from becoming an annoyance to the driver or making it difficult for the driver to drive. Also, since the actuation reaction force changes in a discontinuous manner, the driver can readily recognize that the control pattern has changed.

Figure 24:
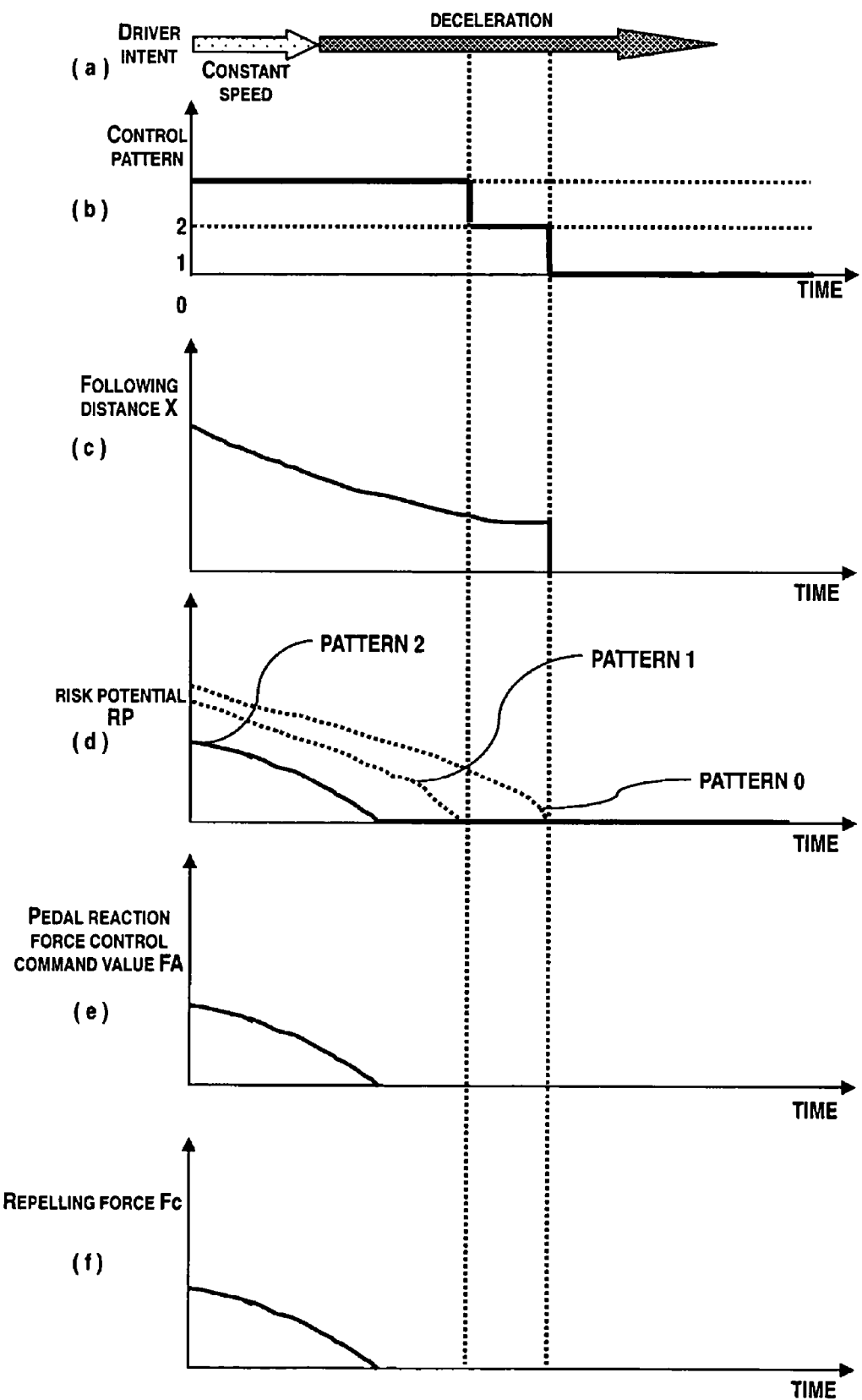
FIG. 24 is a series of graphs illustrating how the intent of the driver, the control pattern, the following distance, the risk potential, the reaction force control command value, and the repelling force change with time when the control pattern changes from Control Pattern 2 to Control Pattern 1 and from Control Pattern 1 to Control Pattern 0.

When the control pattern changes from Control Pattern 2 to Control Pattern 1 and then to Control Pattern 0, the risk potential RP and the accelerator pedal reaction force control command value FA decline to 0 and stay at 0, as shown in graphs (d) and (e) of FIG. 24. Accordingly, the repelling force Fc also declines to 0 and stays at 0, as shown in graph (f) of FIG. 24. As a result, a driving force or braking force that is well-matched to the drivers request can be generated when the driver is attempting to decelerate on his or her own. Also, the control pattern is changed to the control pattern having the longest control execution region, i.e., Control Pattern 0, when an obstacle ceases to be detected. As a result, when a new obstacle is detected, the risk potential RP can be calculated at an early timing and the driver can be informed earlier regarding the existence of the new obstacle.

Basically, the operational effects of the second embodiment will now described. The controller 50A of the vehicle driving assist system 2 detects the host vehicle speed Vh of the host vehicle in which the system is installed and the following distance X of the host vehicle with respect to an obstacle existing in front of the host vehicle, and, based on these detected quantities, the controller 50A calculates a positional relation which between the host vehicle and the obstacle. Additionally, the controller 50A detects the actuation state of the accelerator pedal 72 (which is a driver-operated device used by the driver in order to drive the host vehicle) and selects a control pattern from among a plurality of control patterns based on the accelerator pedal actuation state and the positional relationship of the host vehicle with respect to the obstacle. The controller 50A then calculates a risk potential RP that indicates the degree of convergence between the host vehicle and the obstacle. The calculation is based on the following distance X and the host vehicle speed Vh and is executed in accordance with the selected control pattern. Based on the calculated risk potential RP, the controller 50A controls the actuation reaction force exerted by the accelerator pedal 72 and/or the braking/driving force exerted against the host vehicle. In the second embodiment, preferably both the accelerator pedal actuation reaction force and the braking/driving force acting on the host vehicle are controlled. As a result, the actuation reaction force control and the braking/driving force control can be executed using an appropriate control pattern selected in consideration of the actuation state of the accelerator pedal 72 and the positional relationship between the host vehicle and the obstacle, both of which vary depending on the traffic situation surrounding the host vehicle.

Third Embodiment

Referring primarily to FIGS. 25 to 29, a vehicle driving assist system in accordance with a third embodiment of the present invention will now be explained. The basic constituent features of a vehicle driving assist system in accordance with the third embodiment are the same as those of the second embodiment shown in FIGS. 12 and 13. The third embodiment will be explained chiefly by describing its differences with respect to the second embodiment.

In the second embodiment, when the control pattern is changed, the risk potential RP and the repelling force Fc are changed and the accelerator pedal reaction force control command value FA and the revision amounts ΔDa and ΔDb for controlling the driving force and the braking force are adjusted. In the third embodiment, on the other hand, when the control pattern is changed, the risk potential RP and the repelling force Fc are changed and the accelerator pedal reaction force control command value FA and the revision amounts ΔDa and ΔDb for controlling the driving force and the braking force are individually adjusted.

More specifically, the third embodiment is configured to calculate a reaction force calculation risk potential RPfa for calculating the accelerator pedal reaction force control command value FA and a repelling force calculation risk potential RPfc for calculating the repelling force Fc. The risk potential RPfc for calculating the repelling force is changed in accordance with changes of the control pattern but the risk potential RPfa for calculating the reaction force is not changed.

Figure 25:
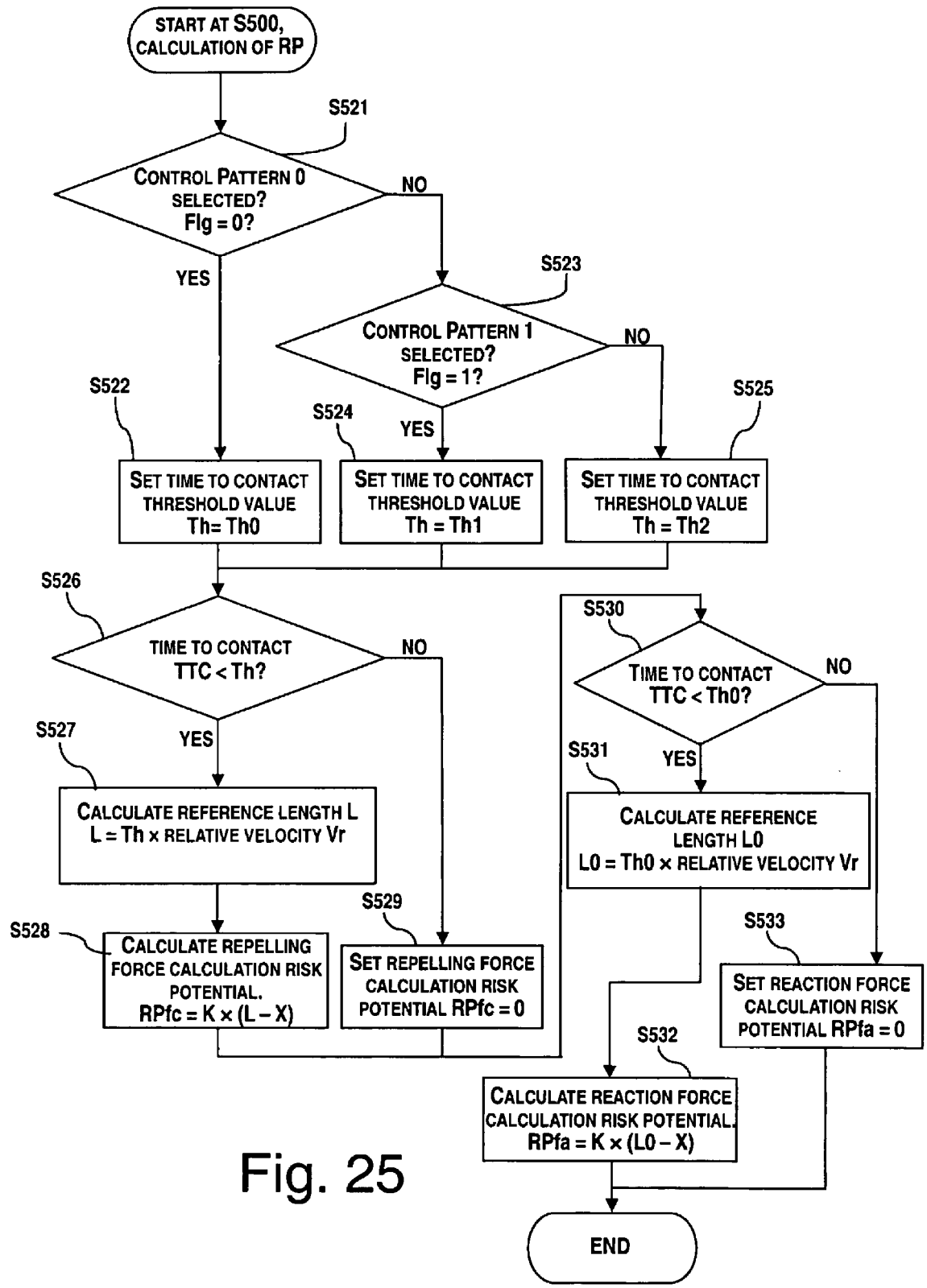
FIG. 25 is a flowchart for explaining the processing steps executed in order to calculate the risk potentials in accordance with a third embodiment of the present invention.

The method of calculating the risk potentials RPfa and RPfc will now be explained with reference to the flowchart of FIG. 25. The risk potentials RPfa and RPfc are calculated in step S500 of the flowchart shown in FIG. 19. The control processing executed in steps S521 to S529 is the same as the control processing executed in steps S501 to S509 of FIG. 8. The risk potential RP calculated in steps S528 and S529 is set as the repelling force calculation risk potential RPfc.

In step S530, the controller 50A determines if the time to contact TTC is smaller than the time to contact threshold value Th0 used for determining if Control Pattern 0 should be selected. If TTC is less than the time to contact threshold value Th0 (TTC<Th0), then the controller 50A proceeds to step S531 and calculates the reference length L0 based on the time to contact threshold value Th0 and the relative velocity Vr using Equation 4 below.

$$L0 = Th0 \times Vr \quad \text{(Equation 4)}$$

In step 532, the controller 50A uses the reference length L0 calculated in step S531 in Equation 5 shown below in order to calculate the reaction force calculation risk potential RPfa.

$$RPfa = K \times (L0 - X) \quad \text{(Equation 5)}$$

If the result of step S530 is negative, then the controller 50A proceeds to step S533 and sets the reaction force calculation risk potential RPfa to 0.

Thus, if the time to contact TTC becomes smaller than the time to contact threshold value Th0, the reaction force calculation risk potential RPfa is calculated as a value corresponding to Control Pattern 0 regardless of which control pattern is actually being used.

Figure 26:
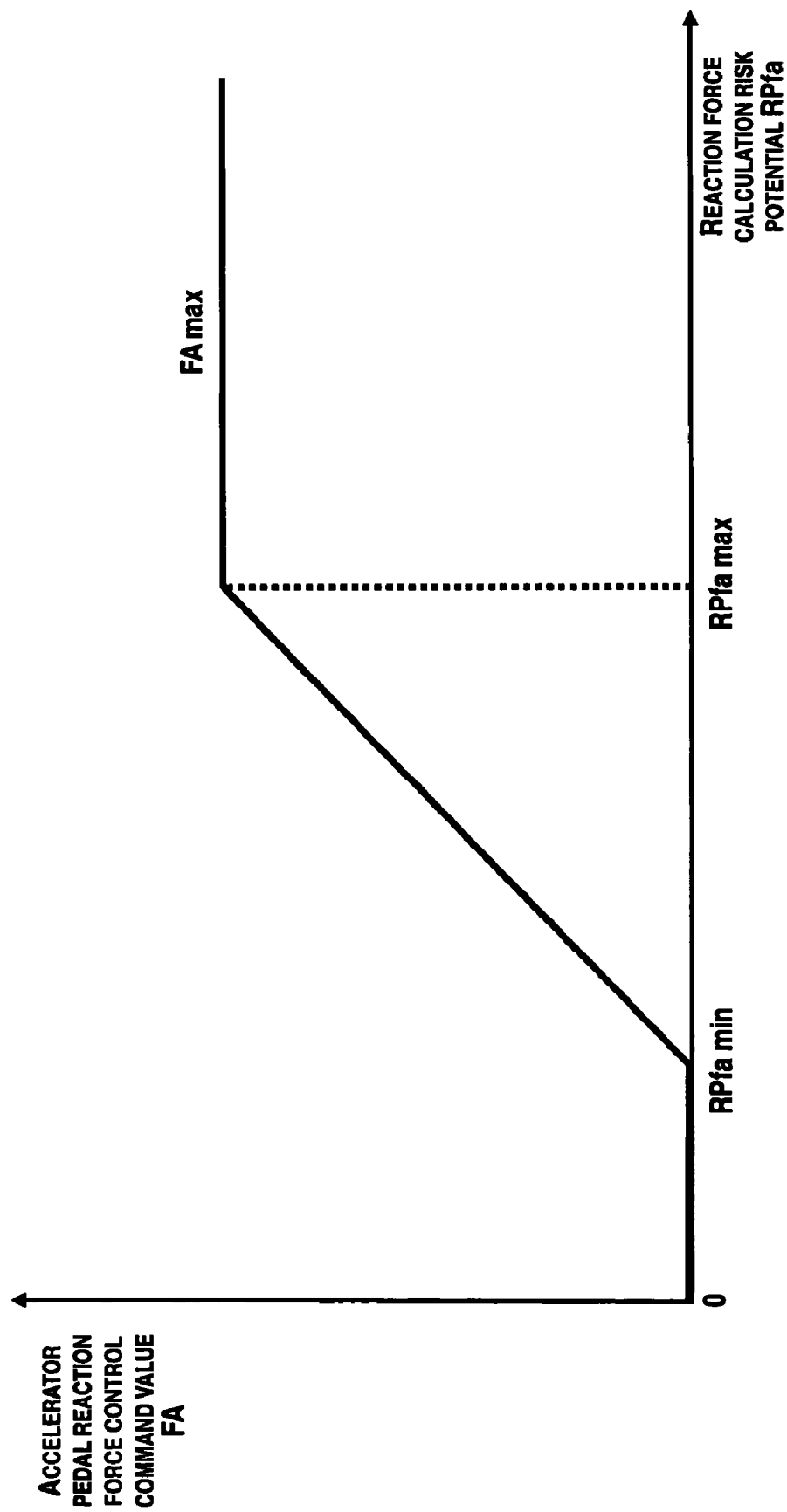
FIG. 26 is a plot of the reaction force control command value versus the reaction force calculation risk potential in accordance with the third embodiment of the present invention.

After calculating the risk potentials RPfa and RPfc, the controller 50A proceeds to step S600 where it calculates the accelerator pedal reaction force control command value FA based on the reaction force calculation risk potential RPfa. FIG. 26 is a plot of the reaction force control command value FA versus the risk potential RPfa. As shown in FIG. 26, when the risk potential RPfa reaches a prescribed minimum value RPfa_min, the accelerator pedal reaction force control command value FA increases gradually as the risk potential RPfa increases. When the risk potential RPfa exceeds a prescribed maximum value RPfa_max, the accelerator pedal reaction force control command value FA remains fixed at a maximum value FAmax.

Figure 27:
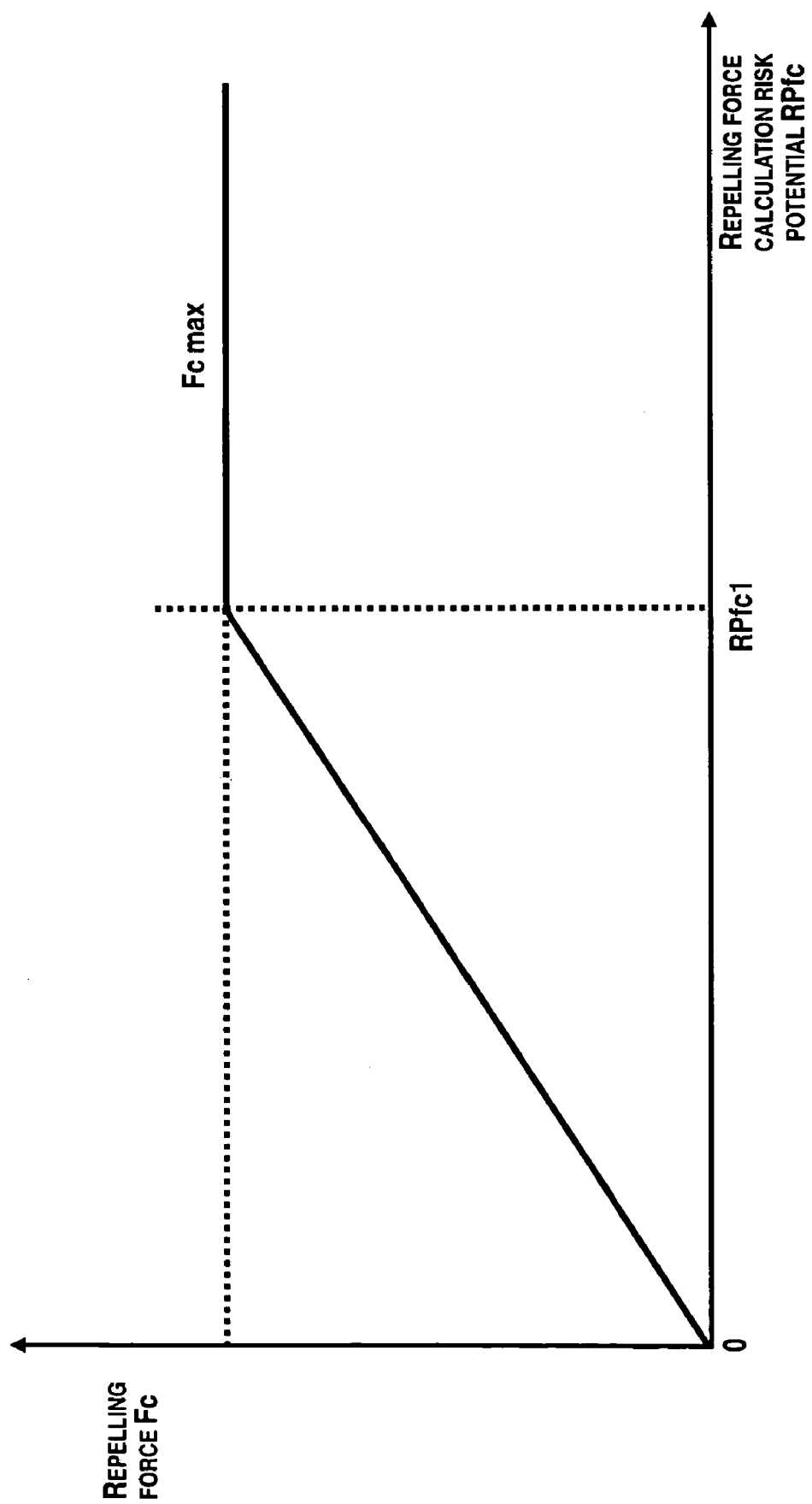
FIG. 27 is a plot of the repelling force versus the repelling force calculation risk potential in accordance with the third embodiment of the present invention.

In step S620, the controller 50A calculates the repelling force Fc based on the repelling force calculating risk potential RPfc. FIG. 27 is a plot of the repelling force Fc versus the risk potential RPfc. As shown in FIG. 27, the repelling force Fc increases gradually as the risk potential RPfc increases. When the risk potential RPfc exceeds a prescribed value RPfc1, the repelling force Fc becomes fixed at a maximum value Fcmax.

The control processing executed in step S650 and subsequent steps is the same as in the second embodiment.

Figure 28:
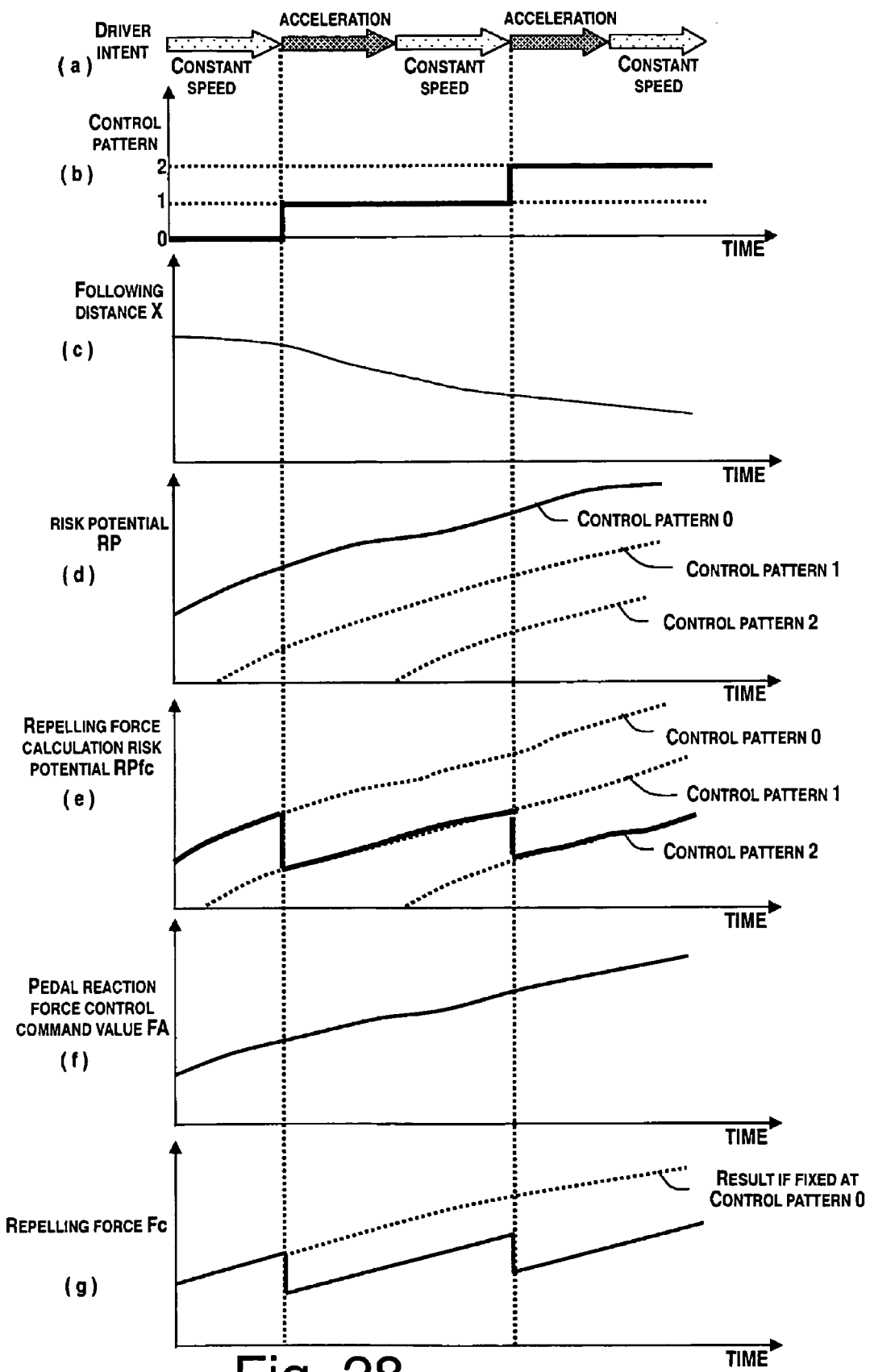
FIG. 28 is a series of graphs illustrating how the intent of the driver, the control pattern, the following distance, the reaction force calculation risk potential, the repelling force calculation risk potential, the reaction force control command value, and the repelling force change with time when the control pattern changes from Control Pattern 0 to Control Pattern 1 and from Control Pattern 1 to Control Pattern 2 in accordance with the third embodiment of the present invention.
Figure 29:
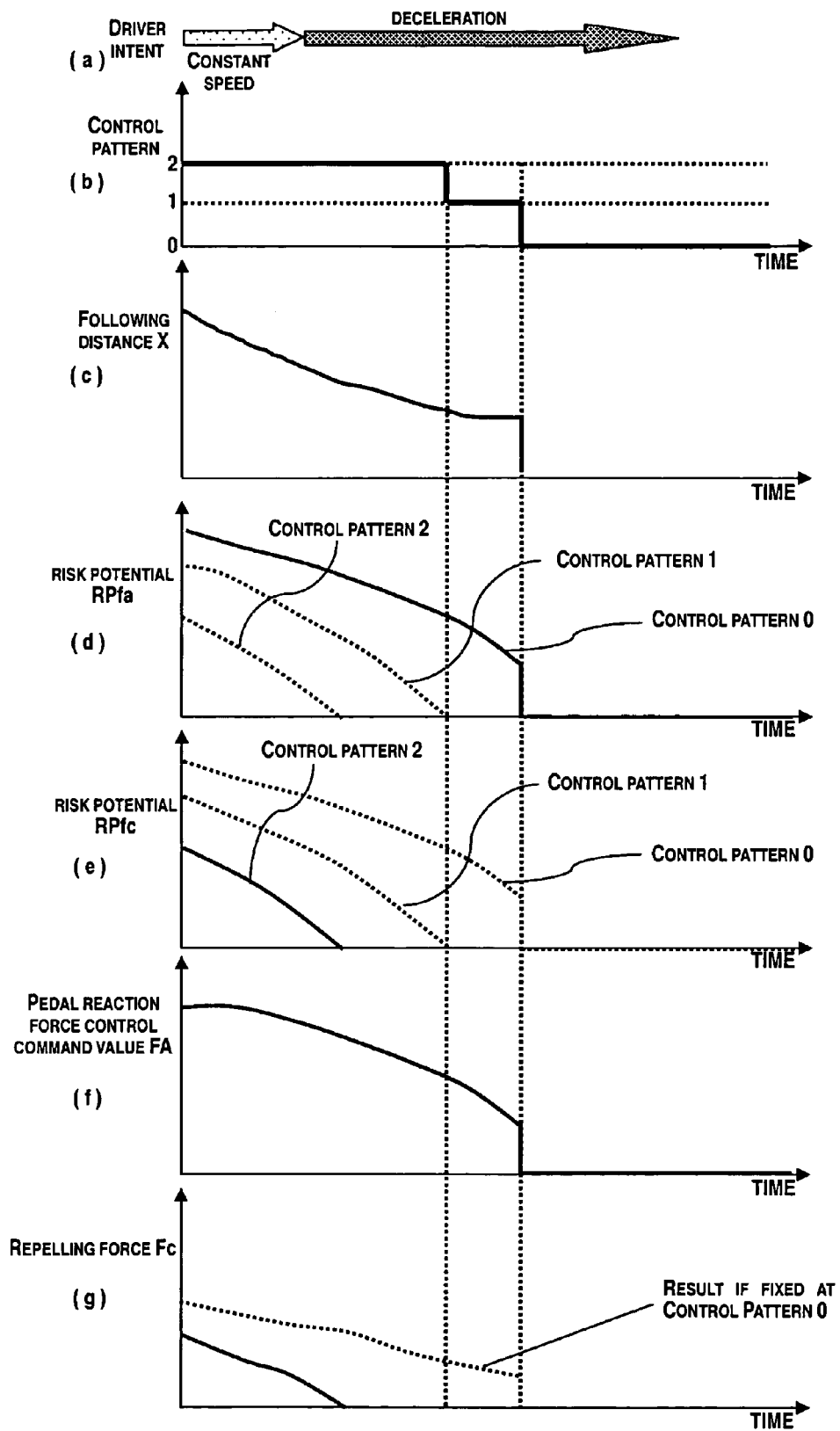
FIG. 29 is a series of graphs illustrating how the intent of the driver, the control pattern, the following distance, the reaction force calculation risk potential, the repelling force calculation risk potential, the reaction force control command value, and the repelling force change with time when the control pattern changes from Control Pattern 2 to Control Pattern 1 and from Control Pattern 1 to Control Pattern 0 in accordance with the third embodiment of the present invention.

The operational effects of a vehicle driving assist system in accordance with the third embodiment of the present invention will now be explained with reference to the drawings. The graphs (a) to (g) of FIG. 28 illustrate how the intent of the driver, the control pattern, the following distance X, the reaction force calculation risk potential RPfa, the repelling force calculation risk potential RPfc, the accelerator pedal reaction force control command value FA, and the repelling force Fc change with time when the control pattern changes from Control Pattern 0 to Control Pattern 1 and from Control Pattern 1 to Control Pattern 2. The graphs (a) to (g) of FIG. 29 illustrate how the intent of the driver, the control pattern, the following distance X, the reaction force calculation risk potential RPfa, the repelling force calculation risk potential RPfc, the accelerator pedal reaction force control command value FA, and the repelling force Fc change with time when the control pattern changes from Control Pattern 2 to Control Pattern 1 and from Control Pattern 1 to Control Pattern 0.

When the control pattern changes from Control Pattern 0 to Control Pattern 1 and then to Control Pattern 2, the reaction force calculation risk potential RPfa is calculated as a value corresponding to Control Pattern 0 and, thus, increases gradually in a continuous fashion as shown in graph (d) of FIG. 28. Conversely, as shown in graph (e) of FIG. 28, the repelling force calculation risk potential RPfc changes in a discontinuous manner in response to the changes in the control pattern, similarly to the second embodiment. As a result, the accelerator pedal reaction force control command value FA increases gradually in a continuous fashion as shown in graph (f) of FIG. 28. Meanwhile, the repelling force Fc also changes in a discontinuous manner as shown in graph (g) of FIG. 28. If the repelling force calculation risk potential RPfc were calculated as a value corresponding to Control Pattern 0, the repelling force Fc would increase gradually as indicated with the dotted-line curve in FIG. 28(g).

When the control pattern changes from Control Pattern 2 to Control Pattern 1 and then to Control Pattern 0, the reaction force calculation risk potential RPfa is calculated as a value corresponding to Control Pattern 0 and decreases to 0 when a preceding vehicle ceases to be detected or the time to contact is equal to or larger than the threshold value Th0. Conversely, as shown in graph (e) of FIG. 29, the repelling force calculation risk potential RPfc decreases to 0 in accordance with Control Pattern 2 and, thereafter, remains at 0, similarly to the risk potential RP of the second embodiment. Consequently, as shown in graph (f) of FIG. 29, the accelerator pedal reaction force control command value FA decreases to 0 in response to the reaction force calculation risk potential RPfa. Similarly, as shown in graph (g) of FIG. 29, the repelling force Fc decreases in response to the repelling force calculation risk potential RPfc and reaches 0 at an earlier time than the accelerator pedal reaction force control command value FA. If the repelling force calculation risk potential RPfc were calculated as a value corresponding to Control Pattern 0, the repelling force Fc would decrease gradually as indicated with the dotted-line curve in graph (g) of FIG. 29.

Basically, the operational effects of the third embodiment will now described. The control pattern selecting unit 54 of the controller 50A is configured to hold the control pattern for controlling the actuation reaction force constant and to select the control pattern for controlling the driving force and braking force based on the intent of the driver and the positional relationship between the host vehicle and the obstacle. More specifically, the reaction force calculation risk potential RPfa for calculating the accelerator pedal reaction force control command value FA is calculated as a value corresponding to Control Pattern 0, which has the longest control execution region. Meanwhile, the repelling force calculation risk potential RPfc for calculating the revision amounts ΔDa and ΔDb for the driving force and braking force is changed in accordance with the selected control pattern. As a result, when, for example, the driver deliberately drives in close proximity to an obstacle, the size of the risk potential RP can be conveyed to the driver via as an actuation reaction force exerted by the accelerator pedal 72 and, at the same time, the amount by which the driving force is decreased can be adjusted such that the driving force is not decreased too much. In this way, the goal of conveying information to the driver and the goal of reducing the annoyance the control imposes on the driver can both be accomplished in an effective manner.

In each of the first to third embodiments, the Control Pattern 2 having a short control execution region, the Control Pattern 1 having a medium-length control execution region, and the Control Pattern 0 having a long control execution region are prepared and a control pattern is selected from among these three control patterns. However, the invention is not limited to using three control patterns. It is also acceptable to have two control patterns or four or more control patterns. In short, any plural number of control patterns having different control execution regions is acceptable.

In the first to third embodiments, the control patterns constitute control execution regions in which actuation reaction force control and/or driving/braking force control is executed. However, as used herein, the term "control pattern" refers to any control content (control format) that indicates how the actuation reaction force of a driver-operated device used to drive a vehicle and/or the braking/driving forces of the host vehicle are/is to be controlled in consideration of a risk potential RP. Thus, the control pattern includes but is not limited to a control execution region. Therefore, the control pattern also includes such control details as calculating the accelerator pedal reaction force control command value FA as a value corresponding to Control Pattern 0 at all times while adjusting the repelling force Fc in accordance with the selected control pattern, as is done in the third embodiment.

In the first to third embodiments, the time to contact TTC of the host vehicle and an obstacle in front of the host vehicle is used for selecting the control pattern. However, the invention is not limited to this method of selection. For example, it is also possible to select the control pattern based on the following time THW or the following distance X between the host vehicle and the preceding obstacle. The following time THW expresses the time required for the host vehicle to reach the current position of the obstacle and can be calculated by dividing the following distance X by the host vehicle speed Vh. The time to contact TTC, the following time THW, and the following distance X of the host vehicle with respect to the obstacle can each be said to express a positional relationship between the host vehicle and the obstacle.

In the first to third embodiments, the controller predicts whether the driver intends to accelerate, decelerate, or travel at constant speed based on the actuation state of the accelerator pedal 72 by the driver, i.e., the actuation speed dS at which the driver is operating the accelerator pedal 72. However, the invention is not limited to this method of determining the intent of the driver. It is also possible to predict the driver's intent based on the actuation amount SA of the accelerator pedal 72 or the amount of additional depression of the accelerator pedal 72 beyond a previous actuation amount. Additionally, it is also possible to predict the intent to pass a preceding vehicle (change lanes) based on the actuation state of the accelerator pedal 72, the actuation state of a directional indicator, or the actuation state of a steering wheel. When the intent to change lanes is detected, the control pattern is selected in the same manner as when the intent to accelerate is detected.

Although in the second embodiment both the accelerator actuation reaction force and the braking/driving forces of the host vehicle are controlled in accordance with the risk potential RP, it is possible to configure a system that is the same as the second embodiment except that control of the accelerator actuation reaction force is not executed and only the braking and driving forces are controlled. Similarly, it is also feasible to omit the braking force control and execute only the driving force control. It is also feasible to generate an actuation reaction force in the brake pedal 92 in accordance with the risk potential RP. The accelerator pedal 72 and the brake pedal 92 are driver-operated devices used by the driver in order to drive the host vehicle.

In the first to third embodiments, the model shown in diagrams (a) and (b) FIG. 7 is assumed and the repelling force of the imaginary elastic body 300 when it is compressed against a preceding obstacle is calculated as a risk potential RP. However, the invention is not limited to such an approach. It is also feasible to calculate a risk potential RP using the time to contact TTC or the following time THW between the host vehicle and a preceding obstacle or to calculate a risk potential RP using a combination of the time to contact TTC and the following time THW.

In the first to third embodiments, the laser radar 10 and the vehicle speed sensor 30 function as the traveling situation detecting section, the controller 50 or 50A function as the relative position calculating section, the accelerator pedal stroke sensor 74 functions as the accelerator pedal actuation state detecting section, the control pattern selecting unit 54 functions as the control pattern selecting section, the risk potential calculating unit 52 functions as the risk potential calculating section, and the accelerator pedal reaction force calculating section 55, the braking/driving force revision amount calculating unit 57, the accelerator pedal reaction force control unit 70, the driving force control unit 73, and the braking force control unit 93 function as the control section. Also, the intent detecting unit 53 functions as the driver intent predicting section. However, the invention is not limited to these specific devices. For example, instead of the laser radar 10, a milliwave radar of a different format or a CCD camera or other camera arranged and configured to detect an image of a region in front of the host vehicle can be used as the traveling situation detecting section.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "section-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle driving assist system comprising:
    a traveling situation detecting section configured to output a traveling situation detection result based on at least a distance between a host vehicle and an obstacle existing in front of the host vehicle and a speed of the host vehicle;
    a relative position calculating section configured to calculate a positional relationship between the host vehicle and the obstacle based on the traveling situation detection result of the traveling situation detecting section;
    an accelerator pedal actuation state detecting section configured to detect an accelerator pedal actuation state of an accelerator pedal of the host vehicle by a driver;
    a control pattern selecting section configured to select a vehicle control pattern from among at least two vehicle control patterns as a selected vehicle control pattern based on the accelerator pedal actuation state detected by the accelerator pedal actuation state detecting section and the positional relationship between the host vehicle and the obstacle calculated by the relative position calculating section;
    a risk potential calculating section configured to calculate a risk potential that indicates a degree of convergence between the host vehicle and the obstacle based on the traveling situation detection result of the traveling situation detecting section, the calculation being executed in accordance with the selected vehicle control pattern; and
    a control section configured to control a control force of at least one of an actuation reaction force exerted by the accelerator pedal and a braking/driving force exerted against the host vehicle based on an amount of the risk potential calculated by the risk potential calculating section, the at least two vehicle control patterns each having a different relationship between the control force and the amount of the risk potential.

2. The vehicle driving assist system as recited in claim 1, further comprising
    a driver intent predicting section configured to predict whether a driver's intention is to accelerate, decelerate, or travel at a constant speed based on the accelerator pedal actuation state detected by the accelerator pedal actuation state detecting section, and
    the control pattern selecting section being further configured to select the selected vehicle control pattern using the driver's intention predicted based on the accelerator pedal actuation state.

3. The vehicle driving assist system as recited in claim 2, wherein
    each of the at least two vehicle control patterns has a different control execution region defined according to a length of the amount of time until the host vehicle contacts the obstacle based on the distance and a relative velocity between the host vehicle and the obstacle, and
    the control pattern selecting section is configured to change the selected vehicle control pattern to one of the at least two vehicle control patterns having a control execution region that is shorter than a current control execution region of the selected vehicle control pattern when the driver intent predicting section predicts that the driver's intention is to accelerate.

4. The vehicle driving assist system as recited in claim 2, wherein
    each of the at least two vehicle control patterns has a different control execution region defined according to a length of the amount of time until the host vehicle contacts the obstacle based on the distance and a relative velocity between the host vehicle and the obstacle, and
    the control pattern selecting section is further configured to change the selected vehicle control pattern to one of the at least two vehicle control patterns having a control execution region that is longer than a current control execution region when the driver intent predicting section predicts that the driver's intention is to decelerate and the positional relationship between the host vehicle and the obstacle is changing in a direction of increasing distance between the host vehicle and the obstacle.

5. The vehicle driving assist system as recited in claim 3, wherein
    the control pattern selecting section is further configured to change the selected vehicle control pattern to one of the at least two vehicle control patterns having a control execution region that is longer than the current control execution region when the driver intent predicting section predicts that the driver's intention is to decelerate and the positional relationship between the host vehicle and the obstacle is changing in a direction of increasing distance between the host vehicle and the obstacle.

6. The vehicle driving assist system as recited in claim 5, wherein
    the control pattern selecting section is further configured to select one from the at least two vehicle control patterns that has a longest control execution region as the selected vehicle control pattern when the traveling situation detecting section ceases to detect the obstacle.

7. The vehicle driving assist system as recited in claim 3, wherein
the control pattern selecting section is further configured to select one from the at least two vehicle control patterns that has a longest control execution region as the selected vehicle control pattern when the traveling situation detecting section ceases to detect the obstacle.

8. The vehicle driving assist system as recited in claim 4, wherein
the control pattern selecting section is further configured to select one from the at least two vehicle control patterns that has a longest control execution region as the selected vehicle control pattern when the traveling situation detecting section ceases to detect the obstacle.

9. The vehicle driving assist system as recited in claim 2, wherein
at least two vehicle control patterns each has a different control execution region defined according to a length of the amount of time until the host vehicle contacts the obstacle based on the distance and a relative velocity between the host vehicle and the obstacle, and
the control pattern selecting section is further configured to select one from the at least two vehicle control patterns that has a longest control execution region as the selected vehicle control pattern when the traveling situation detecting section ceases to detect the obstacle.

10. A vehicle driving assist system as comprising:
a traveling situation detecting section configured to output a traveling situation detection result based on at least a distance between a host vehicle and an obstacle existing in front of the host vehicle and a speed of the host vehicle;
a relative position calculating section configured to calculate a positional relationship between the host vehicle and the obstacle based on the traveling situation detection result of the traveling situation detecting section;
an accelerator pedal actuation state detecting section configured to detect an accelerator pedal actuation state of an accelerator pedal of the host vehicle by a driver;
a control pattern selecting section configured to select a vehicle control pattern from among at least two vehicle control patterns as a selected vehicle control pattern based on the accelerator pedal actuation state detected by the accelerator pedal actuation state detecting section and the positional relationship between the host vehicle and the obstacle calculated by the relative position calculating section;
a risk potential calculating section configured to calculate a risk potential that indicates a degree of convergence between the host vehicle and the obstacle based on the traveling situation detection result of the traveling situation detecting section, the calculation being executed in accordance with the selected vehicle control pattern;
a control section configured to control a control force of at least one of an actuation reaction force exerted by the accelerator pedal and a braking/driving force exerted against the host vehicle based on an amount of the risk potential calculated by the risk potential calculating section; and
a driver intent predicting section configured to predict whether a driver's intention is to accelerate, decelerate, or travel at a constant speed based on the accelerator pedal actuation state detected by the accelerator pedal actuation state detecting section,
the control pattern selecting section being further configured
to select the selected vehicle control pattern using the driver's intention predicted based on the accelerator pedal actuation state, and
to maintain the selected vehicle control pattern for controlling an actuation reaction force and select a different one from the at least two vehicle control patterns as a second selected vehicle control pattern for controlling the braking/driving force based on the driver's intent and the positional relationship between the host vehicle and the obstacle.

11. The vehicle driving assist system as recited in claim 2, wherein
the relative position calculating section is configured to calculate an amount of time until the host vehicle contacts the obstacle based on the distance and a relative velocity between the host vehicle and the obstacle, the amount of time constituting the positional relationship between the host vehicle and the obstacle, and
each of the at least two vehicle control patterns has a different control execution region defined according to a length of the amount of time until the host vehicle contacts the obstacle based on the distance and a relative velocity between the host vehicle and the obstacle.

12. The vehicle driving assist system as recited in claim 1, wherein
the control section is configured to control the actuation reaction force exerted by the accelerator pedal based on the risk potential calculated by the risk potential calculating section.

13. The vehicle driving assist system as recited in claim 1, wherein
the control section is configured to control the braking/driving force exerted against the host vehicle based on the risk potential calculated by the risk potential calculating section.

14. The vehicle driving assist system as recited in claim 1, wherein
the control section is configured to control the actuation reaction force exerted by the accelerator pedal and the braking/driving force exerted against the host vehicle based on the risk potential calculated by the risk potential calculating section.

15. The vehicle driving assist system as recited in claim 14, wherein
the control section is further configured to control the braking/driving force exerted against the host vehicle by controlling at least one of actuation of a braking device to apply a braking force to the host vehicle and a driving force applied to the host vehicle.

16. A vehicle equipped with the vehicle driving assist system according to claim 1.

17. A vehicle driving assist system comprising:
traveling situation detecting means for outputting a traveling situation detection result based on at least a distance between a host vehicle and an obstacle existing in front of the host vehicle and a speed of the host vehicle;
relative position calculating means for calculating a positional relationship between the host vehicle and the obstacle based on the traveling situation detection result;
accelerator pedal actuation state detecting means for detecting an accelerator pedal actuation state of an accelerator pedal of the host vehicle by a driver;
control pattern selecting means for selecting a vehicle control pattern from among at least two vehicle control patterns as a selected vehicle control pattern based on the accelerator pedal actuation state and the positional relationship between the host vehicle and the obstacle;

risk potential calculating means for calculating a risk potential that indicates a degree of convergence between the host vehicle and the obstacle based on the traveling situation detection result and the selected vehicle control pattern; and control means for controlling a control force of at least one of an actuation reaction force exerted by the accelerator pedal and a braking/driving force exerted against the host vehicle based on an amount of the risk potential calculated, the at least two vehicle control patterns each having a different relationship between the control force and the amount of the risk potential.

18. The vehicle driving assist system as recited in claim 17, further comprising driver intent predicting means for predicting whether a driver's intention to accelerate, decelerate, or travel at a constant speed based on the accelerator pedal actuation state, and the control pattern selecting means selecting the selected vehicle control pattern using the driver's intention predicted based on the accelerator pedal actuation state.

19. A vehicle driving assistance method comprising:

calculating a positional relationship between a host vehicle and an obstacle existing in front of the host vehicle based on at least the distance between the host vehicle and the obstacle and the speed of the host vehicle;

detecting the state of actuation of an accelerator pedal of the host vehicle by a driver;

selecting a control pattern from among at least two control patterns as a selected control pattern based on the state of actuation of the accelerator pedal by the driver and the positional relationship between the host vehicle and the obstacle;

calculating a risk potential that indicates a degree of convergence between the host vehicle and the obstacle based on at least said distance and said vehicle speed, said calculation being executed in accordance with the selected control pattern; and controlling a control force of an actuation reaction force exerted by the accelerator pedal and/or a braking/driving force exerted against the host vehicle based on an amount of the calculated risk potential, the at least two control patterns each having a different relationship between the control force and the amount of the calculated risk potential.

20. The vehicle driving assistance method as recited in claim 19, further comprising predicting whether a driver's intention to accelerate, decelerate, or travel at a constant speed based on the accelerator pedal actuation state, and the selecting of the selected vehicle control pattern further using the driver's intention predicted based on the accelerator pedal actuation state.

* * * * *